US012688160B2

(12) United States Patent
Subramanian et al.

(10) Patent No.: US 12,688,160 B2
(45) Date of Patent: Jul. 21, 2026

(54) DISTRIBUTED FILE SYSTEM WITH REDUCED WRITE AND READ LATENCIES

(71) Applicant: NetApp, Inc., San Jose, CA (US)

(72) Inventors: Ananthan Subramanian, San Ramon, CA (US); Daniel McCarthy, Erie, CO (US); Arindam Banerjee, Fremont, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/942,186

(22) Filed: Nov. 8, 2024

(65) Prior Publication Data

US 2025/0068600 A1     Feb. 27, 2025

Related U.S. Application Data

(63) Continuation of application No. 17/449,760, filed on Oct. 1, 2021, now Pat. No. 12,141,104.

(Continued)

(51) Int. Cl.
*G06F 16/00*         (2019.01)
*G06F 16/16*         (2019.01)
(Continued)

(52) U.S. Cl.
CPC ........ *G06F 16/1827* (2019.01); *G06F 16/164* (2019.01); *G06F 16/188* (2019.01); *H04L 67/00* (2013.01)

(58) Field of Classification Search
None
See application file for complete search history.

(56) References Cited

U.S. PATENT DOCUMENTS

| | | | |
|---|---|---|---|
| 7,409,511 B2 | 8/2008 | Edwards et al. | |
| 7,694,191 B1 | 4/2010 | Bono et al. | |

(Continued)

FOREIGN PATENT DOCUMENTS

| | | | | |
|---|---|---|---|---|
| EP | 1369772 A2 | 12/2003 | | |
| WO | 2020124608 A1 | 6/2020 | | |
| WO | WO-2021050875 A1 * | 3/2021 | .......... | G06F 11/1471 |

OTHER PUBLICATIONS

Anderson. Performance and Availability via Client-local NVM in a Distributed File System. Nov. 2020. Usenix.*

(Continued)

*Primary Examiner* — Tuankhanh D Phan

(74) *Attorney, Agent, or Firm* — Jaffery Watson Hamilton & DeSanctis LLP

(57)         ABSTRACT

A method for reducing write latency in a distributed file system. A write request that includes a volume identifier is received at a data management subsystem deployed on a node within a distributed storage system. The data management subsystem maps the volume identifier to a file system volume and maps the file system volume to a set of logical block addresses in a logical block device in a storage management subsystem deployed on the node. The storage management subsystem maps the logical block device to a metadata object for the logical block device on the node that is used to process the write request. The mapping of the file system volume to the set of logical block addresses in the (Continued)

logical block device enables co-locating the metadata object with the file system volume on the node, which reduces the write latency associated with processing the write request.

20 Claims, 15 Drawing Sheets

Related U.S. Application Data

(60) Provisional application No. 63/197,810, filed on Jun. 7, 2021.

(51) Int. Cl.
  *G06F 16/182* (2019.01)
  *G06F 16/188* (2019.01)
  *H04L 67/00* (2022.01)

(56) References Cited

U.S. PATENT DOCUMENTS

| | | | |
|---|---|---|---|
| 7,958,168 | B2 | 6/2011 | Chen et al. |
| 7,979,402 | B1 | 7/2011 | Hamilton et al. |
| 8,086,603 | B2 | 12/2011 | Nasre et al. |
| 8,671,265 | B2 | 3/2014 | Wright |
| 8,903,761 | B1 | 12/2014 | Zayas et al. |
| 8,903,830 | B2 | 12/2014 | Edwards |
| 9,003,021 | B2 | 4/2015 | Wright et al. |
| 9,407,433 | B1 | 8/2016 | Sohi et al. |
| 9,846,539 | B2 | 12/2017 | Babu et al. |
| 10,311,019 | B1 | 6/2019 | Vijendra et al. |
| 10,459,806 | B1 | 10/2019 | He et al. |
| 10,970,259 | B1 | 4/2021 | Bono et al. |
| 11,341,099 | B1 | 5/2022 | Wolfson et al. |
| 11,755,627 | B1 | 9/2023 | Puente et al. |
| 11,868,656 | B2 | 1/2024 | Dronamraju et al. |
| 12,001,431 | B2 | 6/2024 | Jaiswal et al. |
| 12,038,886 | B2 | 7/2024 | Dronamraju et al. |
| 12,045,207 | B2 | 7/2024 | Dronamraju et al. |
| 12,079,242 | B2 | 9/2024 | Banerjee et al. |
| 12,141,104 | B2 * | 11/2024 | Subramanian ...... G06F 16/1827 |
| 12,367,184 | B2 | 7/2025 | Dronamraju et al. |
| 2005/0114594 | A1 | 5/2005 | Corbett et al. |
| 2007/0103984 | A1 | 5/2007 | Kavuri et al. |
| 2008/0010325 | A1 | 1/2008 | Yamakawa |
| 2011/0202705 | A1 | 8/2011 | Hayashi et al. |
| 2012/0023385 | A1 | 1/2012 | Scouarnec et al. |
| 2012/0036161 | A1 | 2/2012 | Lacapra et al. |
| 2012/0310892 | A1 | 12/2012 | Dam et al. |
| 2013/0227145 | A1 | 8/2013 | Wright et al. |
| 2014/0237321 | A1 | 8/2014 | Gold |
| 2015/0193168 | A1 | 7/2015 | Sundaram et al. |
| 2015/0244795 | A1 | 8/2015 | Cantwell et al. |
| 2016/0012117 | A1 | 1/2016 | Dhavale et al. |
| 2016/0014073 | A1 | 1/2016 | Reddy et al. |
| 2016/0048431 | A1 | 2/2016 | Modukuri et al. |
| 2016/0188621 | A1 | 6/2016 | Karinta et al. |
| 2016/0202935 | A1 | 7/2016 | Hoch et al. |
| 2016/0350358 | A1 | 12/2016 | Patel et al. |
| 2017/0026263 | A1 | 1/2017 | Gell et al. |
| 2017/0169048 | A1 | 6/2017 | Fathalla et al. |
| 2017/0212690 | A1 | 7/2017 | Babu et al. |
| 2018/0314725 | A1 | 11/2018 | Subramanian et al. |
| 2019/0147069 | A1 | 5/2019 | Ben Dayan et al. |
| 2019/0384790 | A1 | 12/2019 | Bequet et al. |
| 2020/0097404 | A1 | 3/2020 | Cason |
| 2020/0117362 | A1 | 4/2020 | McCarthy et al. |
| 2020/0117372 | A1 | 4/2020 | Corey et al. |
| 2020/0136943 | A1 | 4/2020 | Banyai et al. |
| 2021/0081292 | A1 | 3/2021 | Jmt et al. |
| 2021/0124645 | A1 | 4/2021 | Chinthekindi et al. |
| 2021/0133001 | A1 | 5/2021 | Bono et al. |
| 2021/0349853 | A1 | 11/2021 | Duttagupta et al. |
| 2021/0349859 | A1 | 11/2021 | Bafna et al. |
| 2022/0391361 | A1 | 12/2022 | Subramanian et al. |
| 2023/0367517 | A1 | 11/2023 | Dronamraju et al. |
| 2023/0393787 | A1 | 12/2023 | Dronamraju et al. |
| 2024/0036759 | A1 | 2/2024 | Dailey et al. |
| 2024/0143233 | A1 | 5/2024 | Dronamraju et al. |
| 2024/0370410 | A1 | 11/2024 | Dronamraju |
| 2024/0427799 | A1 | 12/2024 | Banerjee et al. |
| 2025/0013614 | A1 | 1/2025 | Dronamraju et al. |

OTHER PUBLICATIONS

Containers as a Service. Bring Data Rich Enterprise Applications to your Kubernetes Platform [online]. Portworx, Inc. 2021,8 pages [retrieved on Nov. 9, 2021], Retrieved from the Internet: https://portworx.com/containers-as-a-service/.

Containers vs. Microservices: What's The Difference? [online], BMC, 2021, 19 pages [retrieved on Nov. 9, 2021], Retrieved from the Internet: https://www.bmc.com/blogs/containers-vs-microservices/.

Docker vs Virtual Machines (VMs): A Practical Guide to Docker Containers and VMs [online], Jan. 16, 2020. Weaveworks, 2021, 8 pages, [retrieved on Nov. 9, 2021], Retrieved from the Internet: https://www.weave.works/blog/a-practical-guide-to-choosing-between-docker-containers-and-vms.

Extended European Search Report for Application No. EP22177676 mailed on Nov. 10, 2022, 10 pages.

GitHub., "Stork—Storage Orchestration Runtime for Kubernetes," Libopenstorage/Stork, 2022, pp. 1-14. Retrieved from the Internet: https://github.com/libopenstorage/stork.

Joshi A., "From there to here, from here to there, Containers are Everywhere!," Dec. 16, 2020 [online], Nutanix. Dev, 2021, 14 pages. [Retrieved on Nov. 9, 2021], Retrieved from the Internet: URL: https://www.nutanix.dev/2020/12/16/from-there-to-here-from-here-to-there-containers-are-everywhere/.

Karbon Kubernetes Orchestration. Management Made Simple, [online], Nutanix, 2021, 12 pages [Retrieved on Nov. 9, 2021], Retrieved from the Internet: https://www.nutanix.com/products/karbon.

Kralj M., "How to Orchestrate the Modern Cloud with Kubernetes," Jul. 2020, Software Engineering Blog, Retrieved from the Internet at: https://www.accenture.com/us-en/blogs/software-engineering-blog/kralj-orchestrate-modern-cloud-kubernetes, 7 pages.

Kubernetes., "Production-Grade Container Orchestration," 2021, 6 pages. Retrieved from the Internet: [https://www.kubernetes.io/].

NetApp SolidFire Element OS User Guide for Element OS Version 10.0, Sep. 2017, 215-12504_A0, 160 pages.

Non-Final Office Action mailed on Dec. 7, 2023 for U.S. Appl. No. 17/449,760, filed Oct. 1, 2021, 10 pages.

Non-Final Office Action mailed on Mar. 15, 2023 for U.S. Appl. No. 17/449,753, filed Oct. 1, 2021, 8 pages.

Non-Final Office Action mailed on Oct. 30, 2023 for U.S. Appl. No. 18/047,774, filed Oct. 19, 2022, 8 pages.

Notice of Allowance mailed on Apr. 8, 2024 for U.S. Appl. No. 18/359,192, filed Jul. 26, 2023, 08 pages.

Notice of Allowance mailed on Apr. 24, 2024 for U.S. Appl. No. 18/047,774, filed Oct. 19, 2022, 09 pages.

Notice of Allowance mailed on Aug. 31, 2023 for U.S. Appl. No. 17/449,753, filed Oct. 1, 2021, 7 pages.

Notice of Allowance mailed on Jul. 5, 2024 for U.S. Appl. No. 17/449,760, filed Oct. 1, 2021, 08 pages.

Notice of Allowance mailed on Mar. 13, 2024 for U.S. Appl. No. 17/449,758, filed Oct. 1, 2021, 08 pages.

Notice of Allowance mailed on Nov. 8, 2023 for U.S. Appl. No. 17/449,758, filed Oct. 1, 2021, 8 pages.

ONTAP 9, Concepts, Jun. 2021,215-11959_2021-06_en-us, 38 pages.

ONTAP 9, Disks and Aggregates Power Guide, Jul. 2021,215-11204_2021-07_en-us, 54 pages.

ONTAP 9, Replication between NetApp Element Software and ONTAP, May 2021, 215-12645_2021-05_en-us, 23 pages.

ONTAP 9, System Administration Reference, Jul. 2021, 15-11148_2021-07_en-us, 150 pages.

Pods [online], Kubernetes, 2021, 6 pages [retrieved on Nov. 9, 2011], Retrieved from the Internet: https://kubernetes.io/docs/concepts/workloads/pods/.

(56) References Cited

OTHER PUBLICATIONS

Portworx Data Services, the Complete Solution for Deploying Production-Grade Data Services on Kubernetes. [online], Portworx, Inc. 2021,5 pages. [Retrieved on Nov. 9, 2021], Retrieved from the Internet: https://portworx.com/products/portworx-data-services/.

Portworx Enterprise is the Complete Kubernetes Storage Platform Trusted in Production by the Global 2000 [online], Portworx, Inc. 2021, 10 pages [Retrieved on Nov. 9, 2021], Retrieved from the Internet: https://portworx.com/products/portworx-enterprise/.

Portworx., "Guarantee Your Cloud Native Success with the Portworx Data Services Platform for Kubernetes," Pure Storage, 2 pages. Retrieved from the Internet: https://portworx.com/platform/.

Portworx., "Portworx Releases STORK, An Open-Source Kubernetes Scheduler Extender to Add Additional Capabilities for Stateful Applications in Production," GlobeNewswire, 2018, pp. 1-6. Retrieved from the Internet: https://www.globenewswire.com/en/news-release/2018/01/31/1329233/0/en-Additional-Capabilities-for-Stateful-Applications-in-Production.html.

Portwrox., "Introducing STORK: Intelligent Storage Orchestration for Kubernetes," STORK, 2018, pp. 1-10. Retrieved from the Internet: https://portworx.com/blog/stork-storage-orchestration-kubernetes/.

Restriction Requirement mailed Jun. 16, 2023 for U.S. Appl. No. 17/449,758, filed Oct. 1, 2021, 6 pages.

Sanglaji M., et al., "Nutanix Karbon: Enterprise-grade Kubernetes Solution," Nov. 28, 2018, 5 pages [online], [retrieved on Nov. 9, 2021], Retrieved from the Internet: https://www.nutanix.com/blog/nutanix-karbon-enterprise-grade-kubernetes-solution.

Screen Captures from YouTube Video Clip Entitled "Pure Storage Portworx Deep Dive," 5 pages, Uploaded on Nov. 6, 2020 by User "Tech Field Day". Retrieved from the Internet: https://www.youtube.com/watch?v=WTC198RAbZg.

Software Defined Storage (SDS) Solutions, [online]. Trustradius, 2021, 14 pages [Retrieved on Nov. 9, 2021], Retrieved from the Internet: https://www.trustradius.com/software-defined-storage-sds.

Software-defined Storage, [online] IBM, 2021, 12 pages [retrieved on Nov. 9, 2021], Retrieved from the Internet: https://www.IBM.com/it-infrastructure.

Solution Brief. Easily Operate a Database-as-a-Service Platform, [online], Portworx, Inc. 2021, 2 pages [retrieved on Nov. 9, 2021], Retrieved from the Internet: https://portworx.com/wp-content/uploads/2021/09/pds-solution-brief.pdf.

Tanase C.D., "Portworx—Brief Introduction—k8s Persistent Storage, Mobility, Backup, DR Made Easier," Backup and Restore of Kubernetes Containers, 2021, pp. 1-5. Retrieved from the Internet: https://www.linkedin.com/pulse/portworx-brief-introduction-k8s-persistent-storage-dr-calin.

Vast., "Universal Storage Explained," An E-White Paper, Feb. 12, 2024, 222 pages.

Weil S.A., et al., Ceph: A Scalable, High-performance Distributed File System. In Proceedings of the 7th Symposium on Operating Systems Design and Implementation (OSDI '06), USENIX Association, USA, 2006, pp. 307-320.

What Is Container Orchestration, Exactly? Everything to Know [online], LaunchDarkly, Apr. 28, 2021, 8 pages. [retrieved on Nov. 9, 2021], Retrieved from the Internet: https://launchdarkly.com/blog/what-is-container-orchestration-exactly-everything/.

What is Container Orchestration? [online], CapitalOne, 2021, 8 pages [retrieved on Nov. 9, 2021], Retrieved from the Internet: https://www.capitalone.com/tech/cloud/what-is-container-orchestration/.

Non Final Office Action mailed on Mar. 4, 2025 for U.S. Appl. No. 18/359,188, filed Jul. 26, 2023, 34 pages.

Non Final Office Action mailed on May 19, 2025 for U.S. Appl. No. 18/780,353, filed Jul. 22, 2024, 12 pages.

Non-Final Office Action mailed on Apr. 9, 2025 for U.S. Appl. No. 18/406,515, filed Jan. 8, 2024, 07 pages.

Notice of Allowance mailed on Apr. 21, 2025 for U.S. Appl. No. 18/773,483, filed Jul. 15, 2024, 06 pages.

Notice of Allowance mailed on Mar. 28, 2025 for U.S. Appl. No. 18/773,483, filed Jul. 15, 2024, 09 pages.

Non-Final Office Action mailed on Jan. 30, 2025 for U.S. Appl. No. 18/452,814, filed Aug. 21, 2023, 10 pages.

Hu Y., et al., "NCScale: Toward Optimal Storage Scaling via Network Coding," IEEE/ACM Transactions on Networking, 2022, vol. 30, pp. 271-284.

Non-Final Office Action mailed on Aug. 4, 2025 for U.S. Appl. No. 18/820,543, filed Oct. 16, 2024, 12 pages.

Notice of Allowance mailed on Aug. 4, 2025 for U.S. Appl. No. 18/406,515, filed Jan. 8, 2024, 08 pages.

Notice of Allowance mailed on Jul. 7, 2025 for U.S. Appl. No. 18/452,814, filed Aug. 21, 2023, 08 pages.

Notice of Allowance mailed on Oct. 23, 2025 for U.S. Appl. No. 18/780,353, filed Jul. 22, 2024, 09 pages.

* cited by examiner

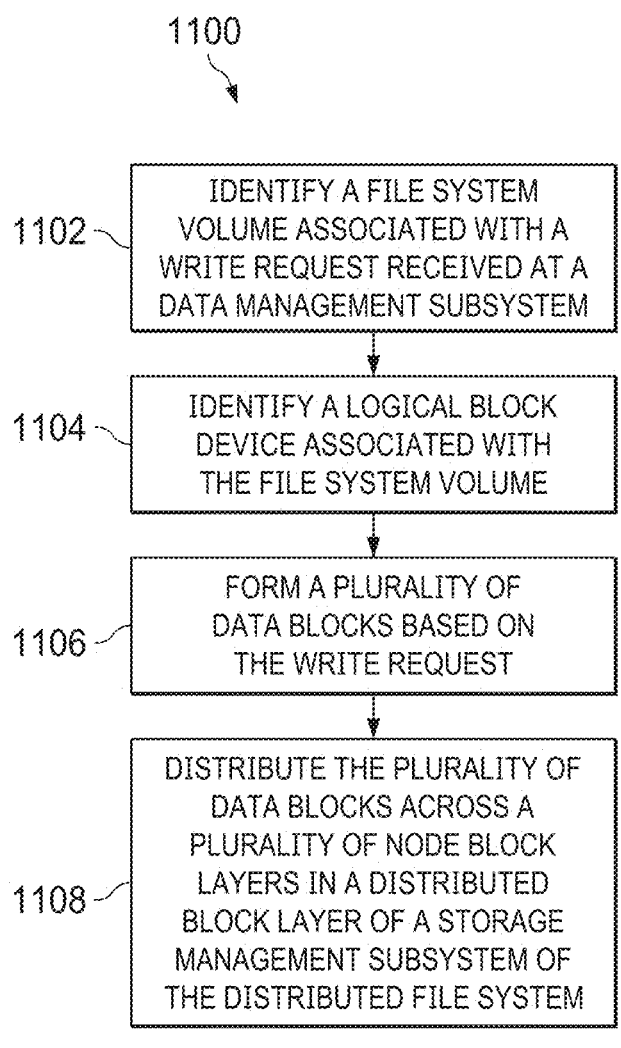

1100

1102 — IDENTIFY A FILE SYSTEM VOLUME ASSOCIATED WITH A WRITE REQUEST RECEIVED AT A DATA MANAGEMENT SUBSYSTEM

1104 — IDENTIFY A LOGICAL BLOCK DEVICE ASSOCIATED WITH THE FILE SYSTEM VOLUME

1106 — FORM A PLURALITY OF DATA BLOCKS BASED ON THE WRITE REQUEST

1108 — DISTRIBUTE THE PLURALITY OF DATA BLOCKS ACROSS A PLURALITY OF NODE BLOCK LAYERS IN A DISTRIBUTED BLOCK LAYER OF A STORAGE MANAGEMENT SUBSYSTEM OF THE DISTRIBUTED FILE SYSTEM

FIG. 11

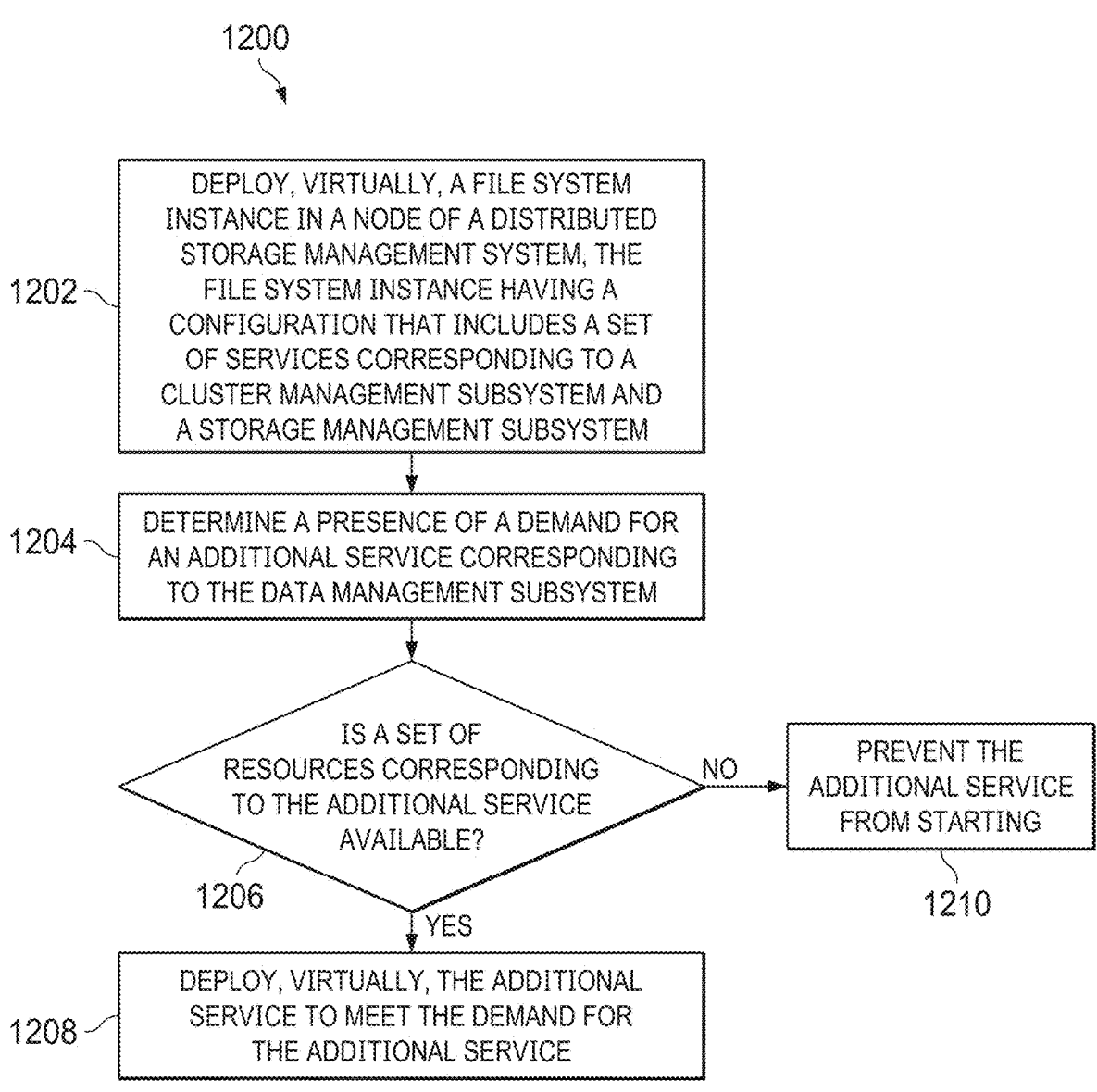

1200

1202 — DEPLOY, VIRTUALLY, A FILE SYSTEM INSTANCE IN A NODE OF A DISTRIBUTED STORAGE MANAGEMENT SYSTEM, THE FILE SYSTEM INSTANCE HAVING A CONFIGURATION THAT INCLUDES A SET OF SERVICES CORRESPONDING TO A CLUSTER MANAGEMENT SUBSYSTEM AND A STORAGE MANAGEMENT SUBSYSTEM

1204 — DETERMINE A PRESENCE OF A DEMAND FOR AN ADDITIONAL SERVICE CORRESPONDING TO THE DATA MANAGEMENT SUBSYSTEM

IS A SET OF RESOURCES CORRESPONDING TO THE ADDITIONAL SERVICE AVAILABLE?

1206

NO → PREVENT THE ADDITIONAL SERVICE FROM STARTING

1210

YES

1208 — DEPLOY, VIRTUALLY, THE ADDITIONAL SERVICE TO MEET THE DEMAND FOR THE ADDITIONAL SERVICE

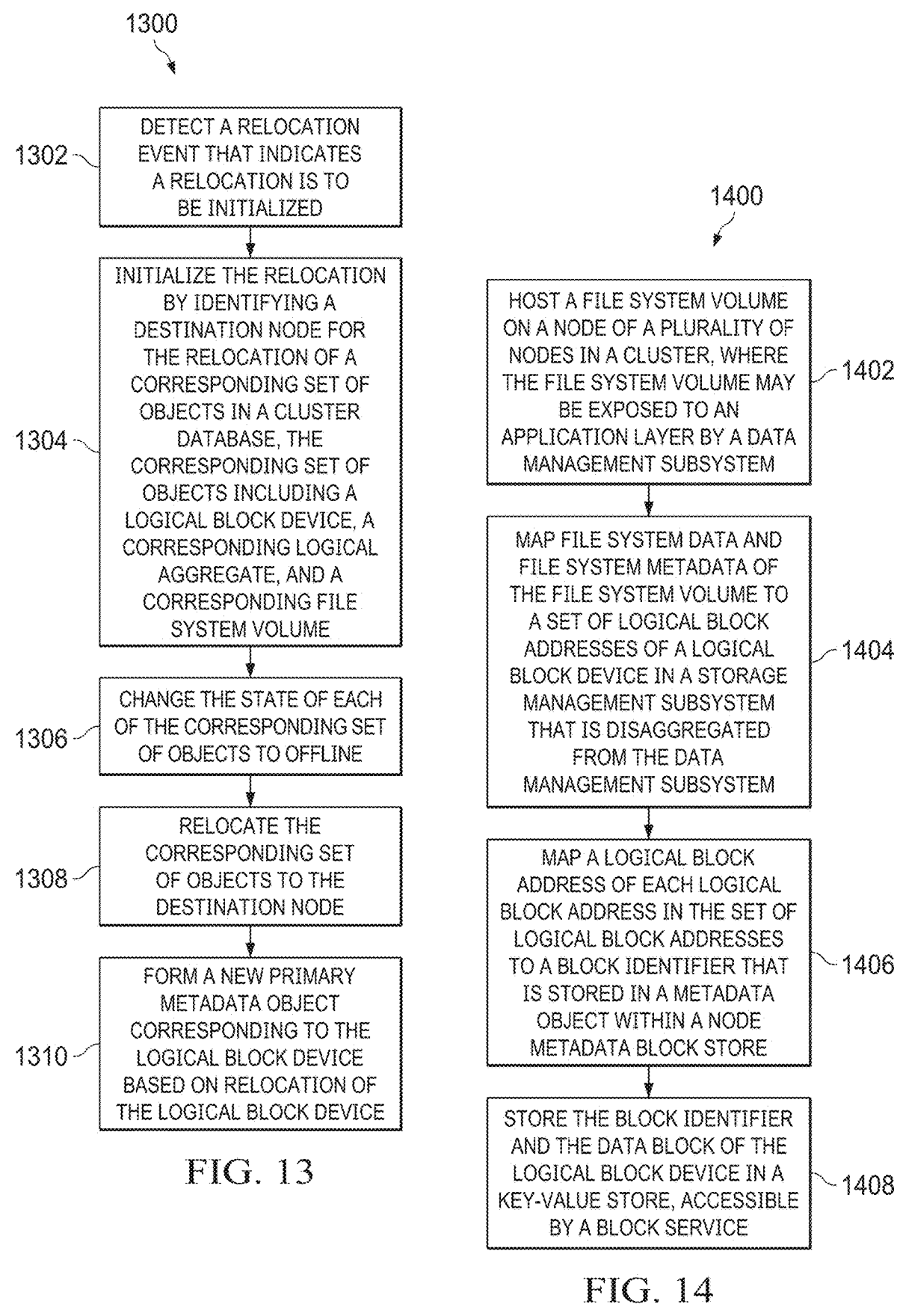

| 1302 | DETECT A RELOCATION EVENT THAT INDICATES A RELOCATION IS TO BE INITIALIZED |

| 1304 | INITIALIZE THE RELOCATION BY IDENTIFYING A DESTINATION NODE FOR THE RELOCATION OF A CORRESPONDING SET OF OBJECTS IN A CLUSTER DATABASE, THE CORRESPONDING SET OF OBJECTS INCLUDING A LOGICAL BLOCK DEVICE, A CORRESPONDING LOGICAL AGGREGATE, AND A CORRESPONDING FILE SYSTEM VOLUME |

| 1306 | CHANGE THE STATE OF EACH OF THE CORRESPONDING SET OF OBJECTS TO OFFLINE |

| 1308 | RELOCATE THE CORRESPONDING SET OF OBJECTS TO THE DESTINATION NODE |

| 1310 | FORM A NEW PRIMARY METADATA OBJECT CORRESPONDING TO THE LOGICAL BLOCK DEVICE BASED ON RELOCATION OF THE LOGICAL BLOCK DEVICE |

| HOST A FILE SYSTEM VOLUME ON A NODE OF A PLURALITY OF NODES IN A CLUSTER, WHERE THE FILE SYSTEM VOLUME MAY BE EXPOSED TO AN APPLICATION LAYER BY A DATA MANAGEMENT SUBSYSTEM | 1402 |

| MAP FILE SYSTEM DATA AND FILE SYSTEM METADATA OF THE FILE SYSTEM VOLUME TO A SET OF LOGICAL BLOCK ADDRESSES OF A LOGICAL BLOCK DEVICE IN A STORAGE MANAGEMENT SUBSYSTEM THAT IS DISAGGREGATED FROM THE DATA MANAGEMENT SUBSYSTEM | 1404 |

| MAP A LOGICAL BLOCK ADDRESS OF EACH LOGICAL BLOCK ADDRESS IN THE SET OF LOGICAL BLOCK ADDRESSES TO A BLOCK IDENTIFIER THAT IS STORED IN A METADATA OBJECT WITHIN A NODE METADATA BLOCK STORE | 1406 |

| STORE THE BLOCK IDENTIFIER AND THE DATA BLOCK OF THE LOGICAL BLOCK DEVICE IN A KEY-VALUE STORE, ACCESSIBLE BY A BLOCK SERVICE | 1408 |

FIG. 14

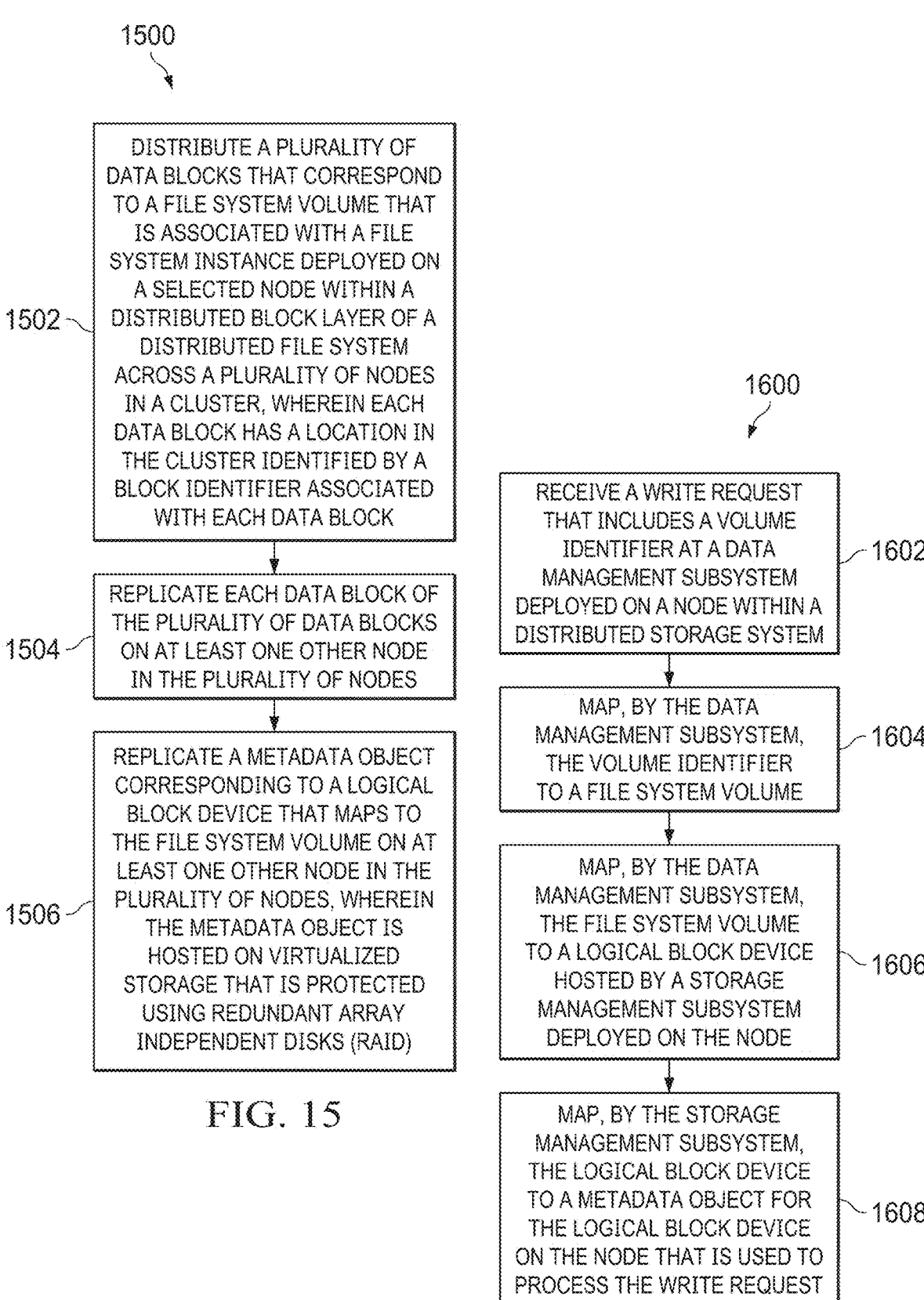

1500

1502 — DISTRIBUTE A PLURALITY OF DATA BLOCKS THAT CORRESPOND TO A FILE SYSTEM VOLUME THAT IS ASSOCIATED WITH A FILE SYSTEM INSTANCE DEPLOYED ON A SELECTED NODE WITHIN A DISTRIBUTED BLOCK LAYER OF A DISTRIBUTED FILE SYSTEM ACROSS A PLURALITY OF NODES IN A CLUSTER, WHEREIN EACH DATA BLOCK HAS A LOCATION IN THE CLUSTER IDENTIFIED BY A BLOCK IDENTIFIER ASSOCIATED WITH EACH DATA BLOCK

1504 — REPLICATE EACH DATA BLOCK OF THE PLURALITY OF DATA BLOCKS ON AT LEAST ONE OTHER NODE IN THE PLURALITY OF NODES

1506 — REPLICATE A METADATA OBJECT CORRESPONDING TO A LOGICAL BLOCK DEVICE THAT MAPS TO THE FILE SYSTEM VOLUME ON AT LEAST ONE OTHER NODE IN THE PLURALITY OF NODES, WHEREIN THE METADATA OBJECT IS HOSTED ON VIRTUALIZED STORAGE THAT IS PROTECTED USING REDUNDANT ARRAY INDEPENDENT DISKS (RAID)

RECEIVE A WRITE REQUEST THAT INCLUDES A VOLUME IDENTIFIER AT A DATA MANAGEMENT SUBSYSTEM DEPLOYED ON A NODE WITHIN A DISTRIBUTED STORAGE SYSTEM — 1602

MAP, BY THE DATA MANAGEMENT SUBSYSTEM, THE VOLUME IDENTIFIER TO A FILE SYSTEM VOLUME — 1604

MAP, BY THE DATA MANAGEMENT SUBSYSTEM, THE FILE SYSTEM VOLUME TO A LOGICAL BLOCK DEVICE HOSTED BY A STORAGE MANAGEMENT SUBSYSTEM DEPLOYED ON THE NODE — 1606

MAP, BY THE STORAGE MANAGEMENT SUBSYSTEM, THE LOGICAL BLOCK DEVICE TO A METADATA OBJECT FOR THE LOGICAL BLOCK DEVICE ON THE NODE THAT IS USED TO PROCESS THE WRITE REQUEST — 1608

FIG. 16

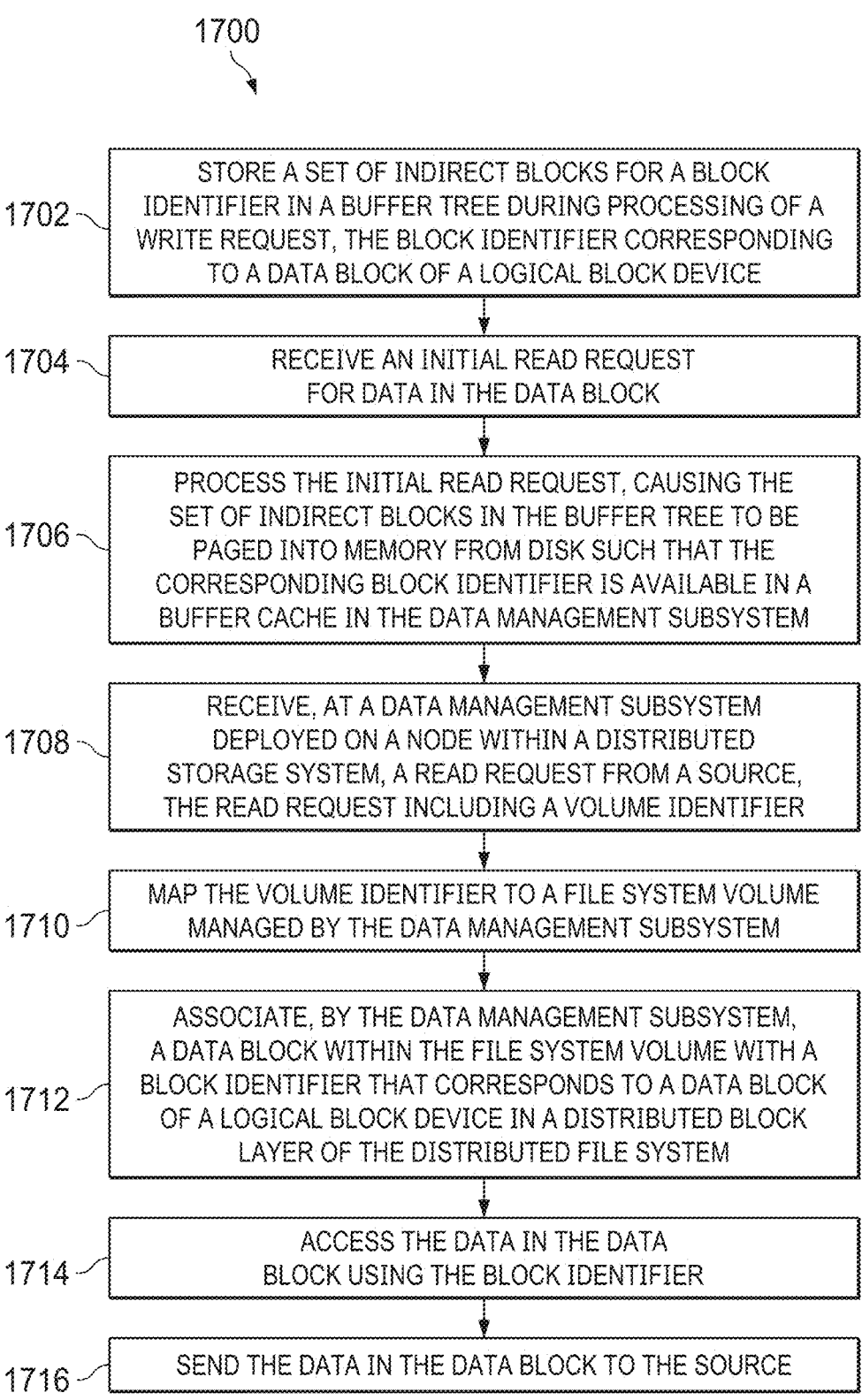

1700

1702 — STORE A SET OF INDIRECT BLOCKS FOR A BLOCK IDENTIFIER IN A BUFFER TREE DURING PROCESSING OF A WRITE REQUEST, THE BLOCK IDENTIFIER CORRESPONDING TO A DATA BLOCK OF A LOGICAL BLOCK DEVICE

1704 — RECEIVE AN INITIAL READ REQUEST FOR DATA IN THE DATA BLOCK

1706 — PROCESS THE INITIAL READ REQUEST, CAUSING THE SET OF INDIRECT BLOCKS IN THE BUFFER TREE TO BE PAGED INTO MEMORY FROM DISK SUCH THAT THE CORRESPONDING BLOCK IDENTIFIER IS AVAILABLE IN A BUFFER CACHE IN THE DATA MANAGEMENT SUBSYSTEM

1708 — RECEIVE, AT A DATA MANAGEMENT SUBSYSTEM DEPLOYED ON A NODE WITHIN A DISTRIBUTED STORAGE SYSTEM, A READ REQUEST FROM A SOURCE, THE READ REQUEST INCLUDING A VOLUME IDENTIFIER

1710 — MAP THE VOLUME IDENTIFIER TO A FILE SYSTEM VOLUME MANAGED BY THE DATA MANAGEMENT SUBSYSTEM

1712 — ASSOCIATE, BY THE DATA MANAGEMENT SUBSYSTEM, A DATA BLOCK WITHIN THE FILE SYSTEM VOLUME WITH A BLOCK IDENTIFIER THAT CORRESPONDS TO A DATA BLOCK OF A LOGICAL BLOCK DEVICE IN A DISTRIBUTED BLOCK LAYER OF THE DISTRIBUTED FILE SYSTEM

1714 — ACCESS THE DATA IN THE DATA BLOCK USING THE BLOCK IDENTIFIER

1716 — SEND THE DATA IN THE DATA BLOCK TO THE SOURCE

FIG. 17

DISTRIBUTED FILE SYSTEM WITH REDUCED WRITE AND READ LATENCIES

CROSS-REFERENCE TO RELATED APPLICATIONS

This application is a continuation of U.S. patent application Ser. No. 17/449,760, filed Oct. 1, 2021, which claims priority to U.S. Provisional Patent Application No. 63/197, 810, filed Jun. 7, 2021. Further, this application is related to U.S. patent application Ser. No. 17/449,753, filed Oct. 1, 2021, and to U.S. Pat. No. 17,449,760, filed Oct. 1, 2021. Each of the foregoing patent applications is hereby incorporated by reference in its entirety for all purposes.

TECHNICAL FIELD

The present description relates to managing data using a distributed file system, and more specifically, to methods and systems for managing data using a distributed file system that has disaggregated data management and storage management subsystems or layers.

BACKGROUND

A distributed storage management system typically includes one or more clusters, each cluster including various nodes or storage nodes that handle providing data storage and access functions to clients or applications. A node or storage node is typically associated with one or more storage devices. Any number of services may be deployed on the node to enable the client to access data that is stored on these one or more storage devices. A client (or application) may send requests that are processed by services deployed on the node. Currently existing distributed storage management systems may use distributed file systems that do not reliably scale as the number of clients and client objects (e.g., files, directories, etc.) scale. Some existing distributed file systems that do enable scaling may rely on techniques that make it more difficult to manage or balance loads. Further, some existing distributed filing systems may be more expensive than desired and/or result in longer write and/or read latencies. Still further, some existing distributed file systems may be unable to protect against node failures or drive failures within a node.

BRIEF DESCRIPTION OF THE DRAWINGS

The present disclosure is best understood from the following detailed description when read with the accompanying figures.

FIG. 11 is a flow diagram illustrating examples of operations in a process for managing data storage using a distributed file system in accordance with one or more embodiments.

FIG. 12 is a flow diagram illustrating examples of operations in a process for managing data storage using a distributed file system in accordance with one or more embodiments.

FIG. 13 is a flow diagram illustrating examples of operations in a process for performing relocation across a distributed file system in accordance with one or more embodiments.

FIG. 14 is a flow diagram illustrating examples of operations in a process for scaling within a distributed file system in accordance with one or more embodiments.

FIG. 15 is a flow diagram illustrating examples of operations in a process for improving resiliency within a distributed file system in accordance with one or more embodiments.

FIG. 16 is a flow diagram illustrating examples of operations in a process for reducing write latency in a distributed file system in accordance with one or more embodiments.

FIG. 17 is a flow diagram illustrating examples of operations in a process for reducing read latency in a distributed file system in accordance with one or more embodiments.

Figure 1:
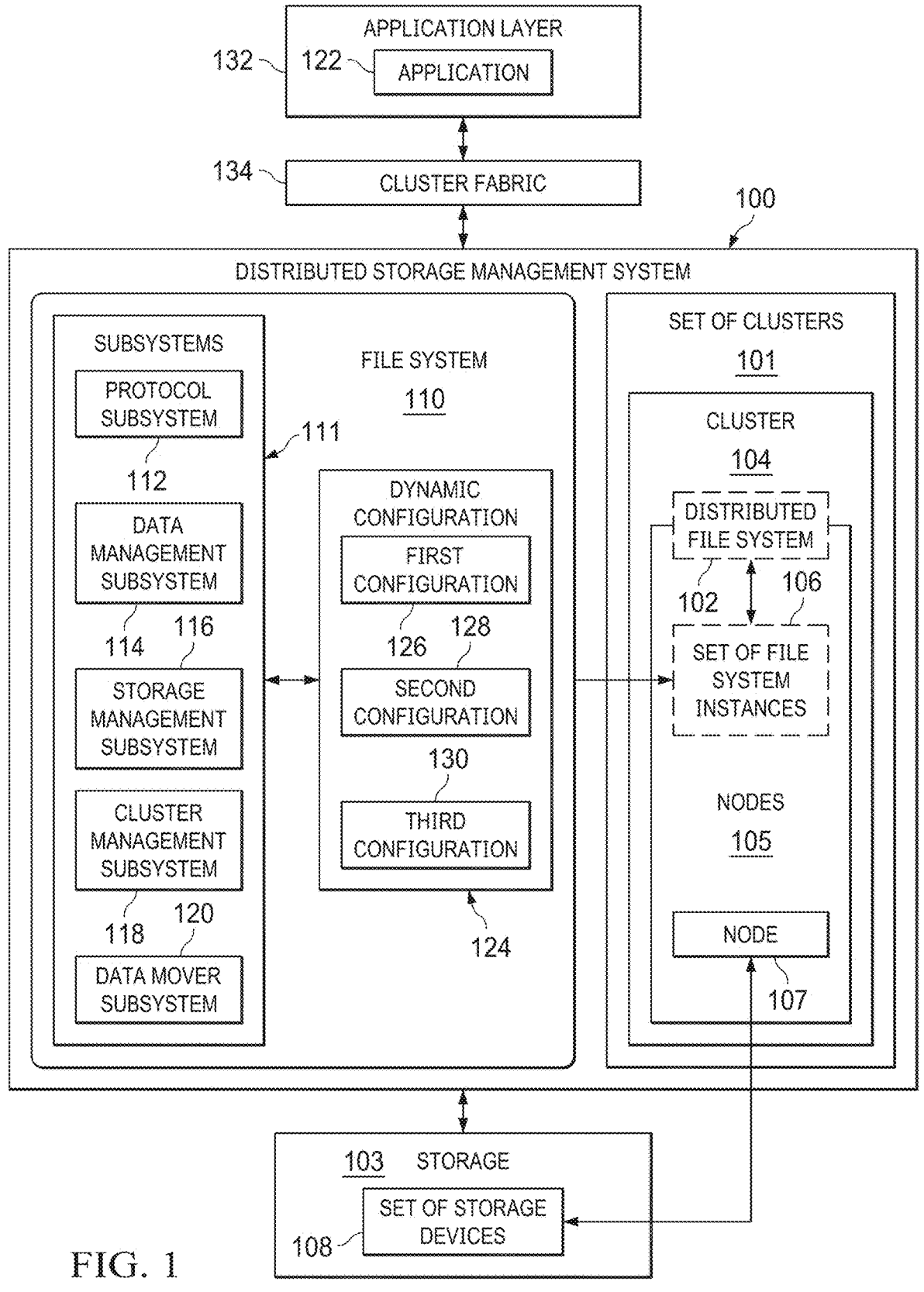
FIG. 1 is a schematic diagram illustrating an example of a distributed storage management system 100 in accordance with one or more embodiments.

The drawings have not necessarily been drawn to scale. Similarly, some components and/or operations may be separated into different blocks or combined into single blocks for the purposes of discussion of some embodiments of the present technology. Moreover, while the technology is amenable to various modifications and alternate forms, specific embodiments have been shown by way of example in the drawings and are described in detail below. The intention, however, is not to limit the technology to the particular embodiments described or shown. On the contrary, the technology is intended to cover all modifications, equivalents, and alternatives falling within the scope of the technology as defined by the appended claims.

DETAILED DESCRIPTION

The demands on data center infrastructure and storage are changing as more and more data centers are transforming into private clouds. Storage solution customers are looking for solutions that can provide automated deployment and lifecycle management, scaling on-demand, higher levels of resiliency with increased scale, and automatic failure detection and self-healing. A system that can scale is one that can continue to function when changed with respect to capacity, performance, and the number of files and/or volumes. A system that is resilient is one that can recover from a fault and continue to provide service dependability. Further, customers are looking for hardware agnostic systems that provide load balancing and application mobility for a lower total cost of ownership.

Traditional data storage solutions may be challenged with respect to scaling and workload balancing. For example, existing data storage solutions may be unable to increase in scale while also managing or balancing the increase in workload. Further, traditional data storage solutions may be challenged with respect to scaling and resiliency. For example, existing data storage solutions may be unable to increase in scale reliably while maintaining high or desired levels of resiliency.

Thus, the various embodiments described herein include methods and systems for managing data storage using a distributed storage management system having a composable, service-based architecture that provides scalability, resiliency, and load balancing. The distributed storage management system may include one or more clusters and a distributed file system that is implemented for each cluster. The embodiments described herein provide a distributed file system that is fully software-defined such that the distributed storage management system is hardware agnostic. For example, the distributed storage management system may be packaged as a container and can run on any server class hardware that runs a Linux operating system with no dependency on the Linux kernel version. The distributed storage management system may be deployable on an underlying Kubernetes platform, inside a Virtual Machine (VM), or run on baremetal Linux.

Further, the embodiments described herein provide a distributed file system that can scale on-demand, maintain resiliency even when scaled, automatically detect node failure within a cluster and self-heal, and load balance to ensure an efficient use of computing resources and storage capacity across a cluster. The distributed file system described herein may be a composable service-based architecture that provides a distributed web scale storage with multi-protocol file and block access. The distributed file system may provide a scalable, resilient, software defined architecture that can be leveraged to be the data plane for existing as well as new web scale applications.

The distributed file system has disaggregated data management and storage management subsystems or layers. For example, the distributed file system has a data management subsystem that is disaggregated from a storage management subsystem such that the data management subsystem operates separately from and independently of, but in communication with, the storage management subsystem. The data management subsystem and the storage management subsystem are two distinct systems, each containing one or more software services. The data management subsystem performs file and data management functions, while the storage management subsystem performs storage and block management functions. In one or more embodiments, the data management subsystem and the storage management subsystem are each implemented using different portions of a Write Anywhere File Layout (WAFL®) file system. For example, the data management subsystem may include a first portion of the functionality enabled by a WAFL® file system and the storage management subsystem may include a second portion of the functionality enabled by a WAFL® file system. The first portion and the second portion are different, but in some cases, the first portion and the second portion may partially overlap. This separation of functionality via two different subsystems contributes to the disaggregation of the data management subsystem and the storage management subsystem.

Disaggregating the data management subsystem from the storage management subsystem, which includes a distributed block persistence layer and a storage manager, may enable various functions and/or capabilities. The data management subsystem may be deployed on the same physical node as the storage management subsystem, but the decoupling of these two subsystems enables the data management subsystem to scale according to application needs, independently of the storage management subsystem. For example, the number of instances of the data management subsystem may be scaled up or down independently of the number of instances of the storage management subsystem. Further, each of the data management subsystem and the storage management subsystem may be spun up independently of the other. The data management subsystem may be scaled up per application needs (e.g., multi-tenancy, QoS needs, etc.), while the storage management subsystem may be scaled per storage needs (e.g., block management, storage performance, reliability, durability, and/or other such needs, etc.)

Still further, this type of disaggregation may enable closer integration of the data management subsystem with an application layer and thereby, application data management policies such as application-consistent checkpoints, rollbacks to a given checkpoint, etc. For example, this disaggregation may enable the data management subsystem to be run in the application layer or plane in proximity to the application. As one specific example, an instance of the data management subsystem may be run on the same application node as one or more applications within the application layer and may be run either as an executable or a statically or dynamically linked library (stateless). In this manner, the data management subsystem can scale along with the application.

A stateless entity (e.g., an executable, a library, etc.) may be an entity that does not have a persisted state that needs to be remembered if the system or subsystem reboots or in the event of a system or subsystem failure. The data management subsystem is stateless in that the data management subsystem does not need to store an operational state about itself or about the data it manages anywhere. Thus, the data management subsystem can run anywhere and can be restarted anytime as long as it is connected to the cluster network. The data management subsystem can host any service, any interface (or LIF) and any volume that needs processing capabilities. The data management subsystem does not need to store any state information about any volume. If and when required, the data management subsystem is capable of fetching the volume configuration information from a cluster database. Further, the storage management subsystem may be used for persistence needs.

The disaggregation of the data management subsystem and the storage management subsystem allows exposing clients or application to file system volumes but allowing them to be kept separate from, decoupled from, or otherwise agnostic to the persistence layer and actual storage. For example, the data management subsystem exposes file system volumes to clients or applications via the application layer, which allows the clients or applications to be kept separate from the storage management subsystem and thereby, the persistence layer. For example, the clients or applications may interact with the data management subsystem without ever be exposed to the storage management subsystem and the persistence layer and how they function. This decoupling may enable the data management subsystem and at least the distributed block layer of the storage management subsystem to be independently scaled for improved performance, capacity, and utilization of resources. The distributed block persistence layer may implement capacity sharing effectively across various applications in the application layer and may provide efficient data reduction techniques such as, for example, but not limited to, global data deduplication across applications.

As described above, the distributed file system enables scaling and load balancing via mapping of a file system volume managed by the data management subsystem to an underlying distributed block layer (e.g., comprise of multiple node block stores) managed by the storage management subsystem. While the file system volume is located on one node, the underlying associated data and metadata blocks may be distributed across multiple nodes within the distributed block layer. The distributed block layer is thin provisioned and is capable of automatically and independently growing to accommodate the needs of the file system volume. The distributed file system provides automatic load balancing capabilities by, for example, relocating (without a data copy) of file system volumes and their corresponding objects in response to events that prompt load balancing.

Further, the distributed file system is capable of mapping multiple file system volumes (pertaining to multiple applications) to the underlying distributed block layer with the ability to service I/O operations in parallel for all of the file system volumes. Still further, the distributed file system enables sharing physical storage blocks across multiple file system volumes by leveraging the global dedupe capabilities of the underlying distributed block layer.

Resiliency of the distributed file system is enhanced via leveraging a combination of block replication (e.g., for node failure) and RAID (e.g., for drive failures within a node). Still further, recovery of local drive failures may be optimized by rebuilding from RAID locally and without having to resort to cross-node data block transfers. Further, the distributed file system provides auto-healing capabilities. Still further, the file system data blocks and metadata blocks are mapped to a distributed key-value store that enables fast lookup of data In this manner, the distributed file system of the distributed storage management system described herein provides various capabilities that improve the performance and utility of the distributed storage management system as compared to traditional data storage solutions. This distributed file system is further capable of servicing I/Os in an efficient manner even with its multi-layered architecture. Improved performance is provided by reducing network transactions (or hops), reducing context switches in the I/O path, or both.

Referring now to the figures, FIG. 1 is a schematic diagram illustrating an example of a distributed storage management system 100 in accordance with one or more embodiments. In one or more embodiments, distributed storage management system 100 is implemented at least partially virtually. Distributed storage management system 100 includes set of clusters 101 and storage 103. Distributed file system 102 may be implemented within set of clusters 101. Set of clusters 101 includes one or more clusters. Cluster 104 is an example of one cluster in set of clusters 101. In one or more embodiments, each cluster in set of clusters 101 may be implemented in a manner similar to that described herein for cluster 104.

Storage 103 associated with cluster 104 may include storage devices that are at a same geographic location (e.g., within a same datacenter, in a single on-site rack, inside a same chassis of a storage node, etc. or a combination thereof) or at different locations (e.g., in different datacenters, in different racks, etc. or a combination thereof). Storage 103 may include disks (e.g., solid state drives (SSDs)), disk arrays, non-volatile random-access memory (NVRAM), one or more other types of storage devices or data storage apparatuses, or a combination thereof. In some embodiments, storage 103 includes one or more virtual storage devices such as, for example, without limitation, one or more cloud storage devices.

Cluster 104 includes a plurality of nodes 105. Distributed storage management system 100 includes set of file system instances 106 that are implemented across nodes 105 of cluster 104. Set of file system instances 106 may form distributed file system 102 within cluster 104. In some embodiments, distributed file system 102 is implemented across set of clusters 101. Nodes 105 may include a small or large number nodes. In some embodiments, nodes 105 may include 10 nodes, 20 nodes, 40 nodes, 50 nodes, 80 nodes, 100 nodes, or some other number of nodes. At least a portion (e.g., one, two, three, or more) of nodes 105 is associated with a corresponding portion of storage 103. Node 107 is one example of a node in nodes 105. Node 107 may be associated with (e.g., connected or attached to and in communication with) set of storage devices 108 of storage 103. In one or more embodiments, node 107 may include a virtual implementation or representation of a storage controller or a server, a virtual machine such as a storage virtual machine, software, or combination thereof.

Each file system instance of set of file system instances 106 may be an instance of file system 110. In one or more embodiments, distributed storage management system 100 has a software-defined architecture. In some embodiments, distributed storage management system 100 is running on a Linux operating system. In one or more embodiments, file system 110 has a software-defined architecture such that each file system instance of set of file system instances 106 has a software-defined architecture. A file system instance may be deployed on a node of nodes 105. In some embodiments, more than one file system instance may be deployed on a particular node of nodes 105. For example, one or more file system instances may be implemented on node 107.

File system 110 includes various software-defined subsystems that enable disaggregation of data management and storage management. For example, file system 110 includes a plurality of subsystems 111, which may be also referred to as a plurality of layers, each of which is software-defined. For example, each of subsystems 111 may be implemented using one or more software services. This software-based implementation of file system 110 enables file system 110 to be implemented fully virtually and to be hardware agnostic.

Subsystems 111 include, for example, without limitation, protocol subsystem 112, data management subsystem 114, storage management subsystem 116, cluster management subsystem 118, and data mover subsystem 120. Because subsystems 111 are software service-based, one or more of subsystems 111 can be started (e.g., "turned on") and stopped ("turned off") on-demand. In some embodiments, the various subsystems 111 of file system 110 may be implemented fully virtually via cloud computing.

Protocol subsystem 112 may provide access to nodes 105 for one or more clients or applications (e.g., application 122) using one or more access protocols. For example, for file access, protocol subsystem 112 may support a Network File System (NFS) protocol, a Common Internet File System (CIFS) protocol, a Server Message Block (SMB) protocol, some other type of protocol, or a combination thereof. For block access, protocol subsystem 112 may support an Internet Small Computer Systems Interface (iSCSI) protocol. Further, in some embodiments, protocol subsystem 112 may handle object access via an object protocol, such as Simple Storage Service (S3). In some embodiments, protocol subsystem 112 may also provide native Portable Operating System Interface (POSIX) access to file clients when a client-side software installation is allowed as in, for example, a Kubernetes deployment via a Container Storage Interface (CSI) driver. In this manner, protocol subsystem 112 functions as the application-facing (e.g., application programming interface (API)-facing) subsystem of file system 110.

Data management subsystem 114 may take the form of a stateless subsystem that provides multi-protocol support and various data management functions. In one or more embodiments, data management subsystem 114 includes a portion of the functionality enabled by a file system such as, for example, the Write Anywhere File Layout (WAFL®) file system. For example, an instance of WAFL® may be implemented to enable file services and data management functions (e.g., data lifecycle management for application data) of data management subsystem 114. Some of the data management functions enabled by data management subsystem 114 include, but are not limited to, compliance management, backup management, management of volume policies, snapshots, clones, temperature-based tiering, cloud backup, and/or other types of functions.

Storage management subsystem 116 is resilient and scalable. Storage management subsystem 116 provides efficiency features, data redundancy based on software Redundant Array of Independent Disks (RAID), replication, fault detection, recovery functions enabling resiliency, load balancing, Quality of Service (QoS) functions, data security, and/or other functions (e.g., storage efficiency functions such as compression and deduplication). Further, storage management subsystem 116 may enable the simple and efficient addition or removal of one or more nodes to nodes 105. In one or more embodiments, storage management subsystem 116 enables the storage of data in a representation that is block-based (e.g., data is stored within 4 KB blocks, and inodes are used to identify files and file attributes such as creation time, access permissions, size, and block location, etc.).

Storage management subsystem 116 may include a portion of the functionality enabled by a file system such as, for example, WAFL®. This functionality may be at least partially distinct from the functionality enabled with respect to data management subsystem 114.

Data management subsystem 114 is disaggregated from storage management subsystem 116, which enables various functions and/or capabilities. In particular, data management subsystem 114 operates separately from or independently of storage management subsystem 116 but in communication with storage management subsystem 116. For example, data management subsystem 114 may be scalable independently of storage management subsystem 116, and vice versa. Further, this type of disaggregation may enable closer integration of data management subsystem 114 with application layer 132 and thereby, can be configured and deployed with specific application data management policies such as application-consistent checkpoints, rollbacks to a given checkpoint, etc. Additionally, this disaggregation may enable data management subsystem 114 to be run on a same application node as an application in application layer 132. In other embodiments, data management 114 may be run as a separate, independent component within a same node as storage management subsystem 116 and may be independently scalable with respect to storage management subsystem 116.

Cluster management subsystem 118 provides a distributed control plane for managing cluster 104, as well as the addition of resources to and/or the deletion of resources from cluster 104. Such a resource may be a node, a service, some other type of resource, or a combination thereof. Data management subsystem 114, storage management subsystem 116, or both may be in communication with cluster management subsystem 118, depending on the configuration of file system 110. In some embodiments, cluster management subsystem 118 is implemented in a distributed manner that enables management of one or more other clusters.

Data mover subsystem 120 provides management of targets for data movement. A target may include, for example, without limitation, a secondary storage system used for disaster recovery (DR), a cloud, a target within the cloud, a storage tier, some other type of target that is local or remote to the node (e.g., node 107) on which the instance of file system 110 is deployed, or a combination thereof. In one or more embodiments, data mover subsystem 120 can support data migration between on-premises and cloud deployments.

In one or more embodiments, file system 110 may be instanced having dynamic configuration 124. Dynamic configuration 124 may also be referred to as a persona for file system 110. Dynamic configuration 124 of file system 110 at a particular point in time is the particular grouping or combination of the subsystems in subsystems 111 that are started (or turned on) at that particular point in time on the particular node in which the instance of file system 110 is deployed. For example, at a given point in time, dynamic configuration 124 of file system 110 may be first configuration 126, second configuration 128, third configuration 130, or another configuration. With first configuration 126, both data management subsystem 114 and storage management subsystem 116 are turned on or deployed. With second configuration 128, a portion or all of the one or more services that make up data management subsystem 114 are not turned on or are not deployed. With third configuration 130, a portion or all of the one or more services that make up storage management subsystem 116 are not turned on or are not deployed. Dynamic configuration 124 is a configuration that can change over time depending on the needs of the client (or application) in association with file system 110.

Cluster 104 is in communication with one or more clients or applications via application layer 132 that may include, for example, application 122. In one or more embodiments, nodes 105 of cluster 104 may communicate with each other and/or through application layer 132 via cluster fabric 134.

In some cases, data management subsystem 114 is implemented virtually "close to" or within application layer 132. For example, the disaggregation or decoupling of data management subsystem 114 and storage management subsystem 116 may enable data management subsystem 114 to be deployed outside of nodes 105. In one or more embodiments, data management subsystem 114 may be deployed in application layer 132 and may communicate with storage management subsystem 116 over one or more communications links and using protocol subsystem 112. In some embodiments, the disaggregation or decoupling of data management subsystem 114 and storage management subsystem 116 may enable a closer integration of data management functions with application layer management policies. For example, data management subsystem 114 may be used to define an application tenancy model, enable app-consistent checkpoints, enable a roll-back to a given checkpoint, perform other application management functions, or a combination thereof.

Figure 2:
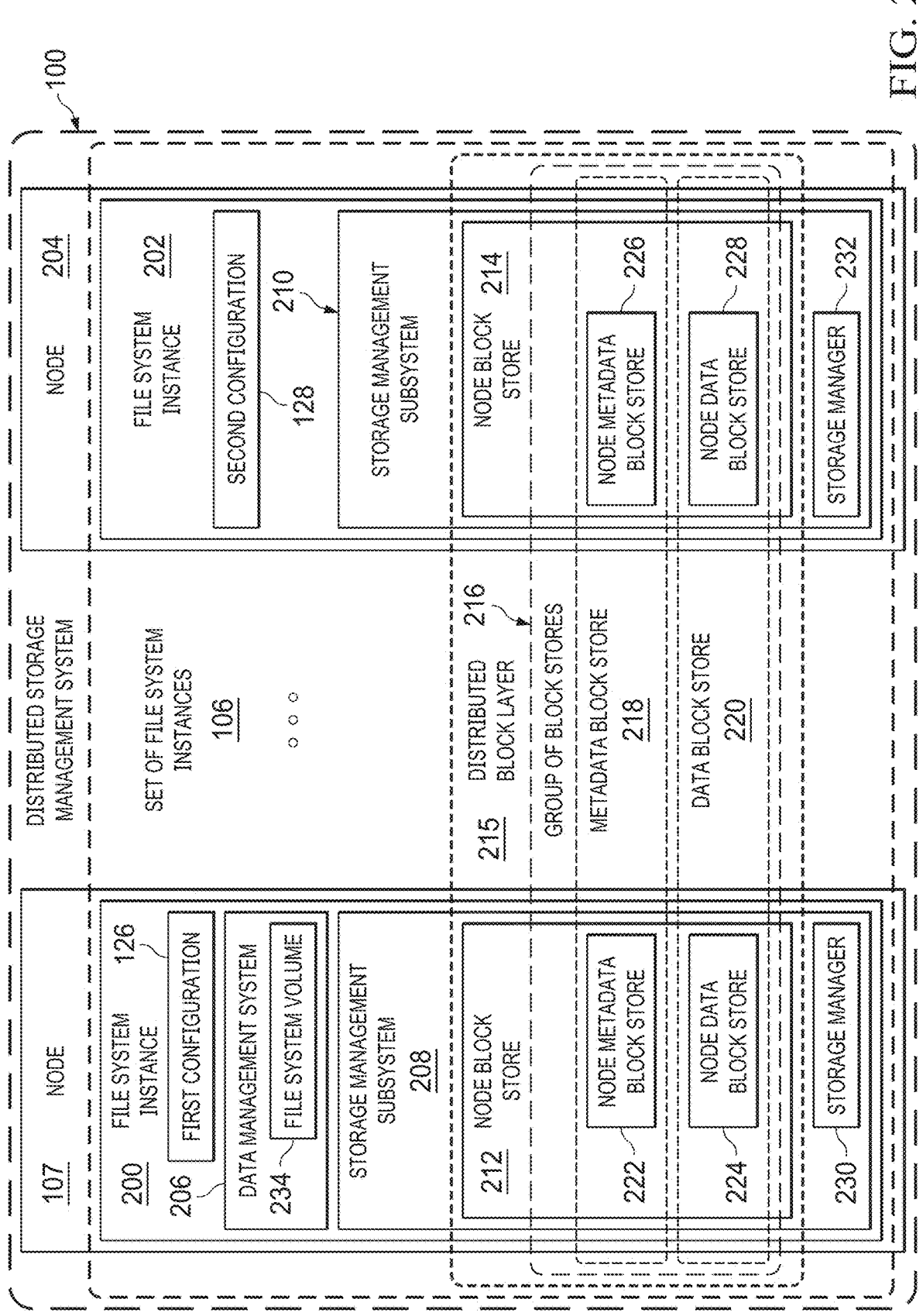
FIG. 2 is another schematic diagram of distributed storage management system 100 from FIG. 1 in accordance with one or more embodiments.

FIG. 2 is another schematic diagram of distributed storage management system 100 from FIG. 1 in accordance with one or more embodiments. As previously described, distributed storage management system 100 includes set of file system instances 106, each of which is an instance of file system 110 in FIG. 1. In one or more embodiments, set of file system instances 106 includes file system instance 200 deployed on node 107 and file system instance 202 deployed on node 204. File system instance 200 and file system instance 202 are instances of file system 110 described in FIG. 1. Node 107 and node 204 are both examples of nodes in nodes 105 in cluster 104 in FIG. 1.

File system instance 200 may be deployed having first configuration 126 in which both data management subsystem 206 and storage management subsystem 208 are deployed. One or more other subsystems of subsystems 111 in FIG. 1 may also be deployed in first configuration 126. File system instance 202 may have second configuration 128 in which storage management subsystem 210 is deployed and no data management subsystem is deployed. In one or more embodiments, one or more subsystems in file system instance 200 may be turned on and/or turned off on-demand to change the configuration of file system instance 200 on-demand. Similarly, in one or more embodiments, one or more subsystems in file system instance 202 may be turned on and/or turned off on-demand to change the configuration of file system instance 202 on-demand.

Data management subsystem 206 may be an instance of data management subsystem 114 described in FIG. 1. Storage management subsystem 208 and storage management subsystem 210 may be instances of storage management subsystem 116 in FIG. 1.

Storage management subsystem 208 includes node block store 212 and storage management subsystem 210 includes node block store 214. Node block store 212 and node block store 214 are two node block stores in a plurality of node block stores that form distributed block layer 215 of distributed storage management system 100. Distributed block layer 215 is a distributed block virtualization layer (which may be also referred to as a distributed block persistence layer) that virtualizes storage 103 connected to nodes 105 in FIG. 1 into a group of block stores 216 that are globally accessible by the various ones of nodes 105 in FIG. 1, including node 107 and node 204. Each block store in group of block stores 216 is a distributed block store that spans cluster 104 in FIG. 1. Distributed block layer 215 enables any one of nodes 105 in cluster 104 in FIG. 1 to access any one or more blocks in group of block stores 216.

In one or more embodiments, group of block stores 216 may include, for example, at least one metadata block store 218 and at least one data block store 220 that are distributed across nodes 105 in cluster 104, including node 107 and node 204. Thus, metadata block store 218 and data block store 220 may also be referred to as a distributed metadata block store and a distributed data block store, respectively. In one or more embodiments, node block store 212 includes node metadata block store 222 and node data block store 224. Node block store 214 includes node metadata block store 226 and node data block store 228. Node metadata block store 222 and node metadata block store 226 form at least a portion of metadata block store 218. Node data block store 224 and node data block store 228 form at least a portion of data block store 220.

Storage management subsystem 208 further includes storage manager 230; storage management subsystem 210 further includes storage manager 232. Storage manager 230 and storage manager 232 may be implemented in various ways. In one or more examples, each of storage manager 230 and storage manager 232 includes a portion of the functionality enabled by a file system such as, for example, WAFL, in which different functions are enabled as compared to the instance of WAFL enabled with data management subsystem

114. Storage manager 230 and storage manager 232 enable management of the one or more storage devices associated with node 107 and node 204, respectively. Storage manager 230 and storage manager 232 may provide various functions including, for example, without limitation, checksums, context protection, RAID management, handling of unrecoverable media errors, other types of functionality, or a combination thereof.

Although node block store 212 and node block store 214 are described as being part of or integrated with storage management subsystem 208 and storage management subsystem 210, respectively, in other embodiments, node block store 212 and node block store 214 may be considered separate from but in communication with the respective storage management subsystems, together providing the functional capabilities described above.

File system instance 200 and file system instance 202 may be parallel file systems. Each of file system instance 200 and file system instance 202 may have its own metadata functions that operate in parallel with respect to the metadata functions of the other file system instances in distributed file system 102. In some embodiments, each of file system instance 200 and file system instance 202 may be configured to scale to 2 billion files. Each of file system instance 200 and file system instance 202 may be allowed to expand as long as there is available capacity (e.g., memory, CPU resources, etc.) in cluster 104 in FIG. 1.

In one or more embodiments, data management subsystem 206 supports and exposes one or more file systems volumes, such as, for example, file system volume 234, to application layer 132 in FIG. 1. File system volume 234 may include file system metadata and file system data. The file system metadata and file system data may be stored in data blocks in data block store 220. In other words, the file system metadata and the file system data may be distributed across nodes 105 within data block store 220. Metadata block store 222 may store a mapping of a block of file system data to a mathematically or algorithmically computed hash of the block. This hash may be used to determine the location of the block of the file system data within distributed block layer 215.

Figure 3:
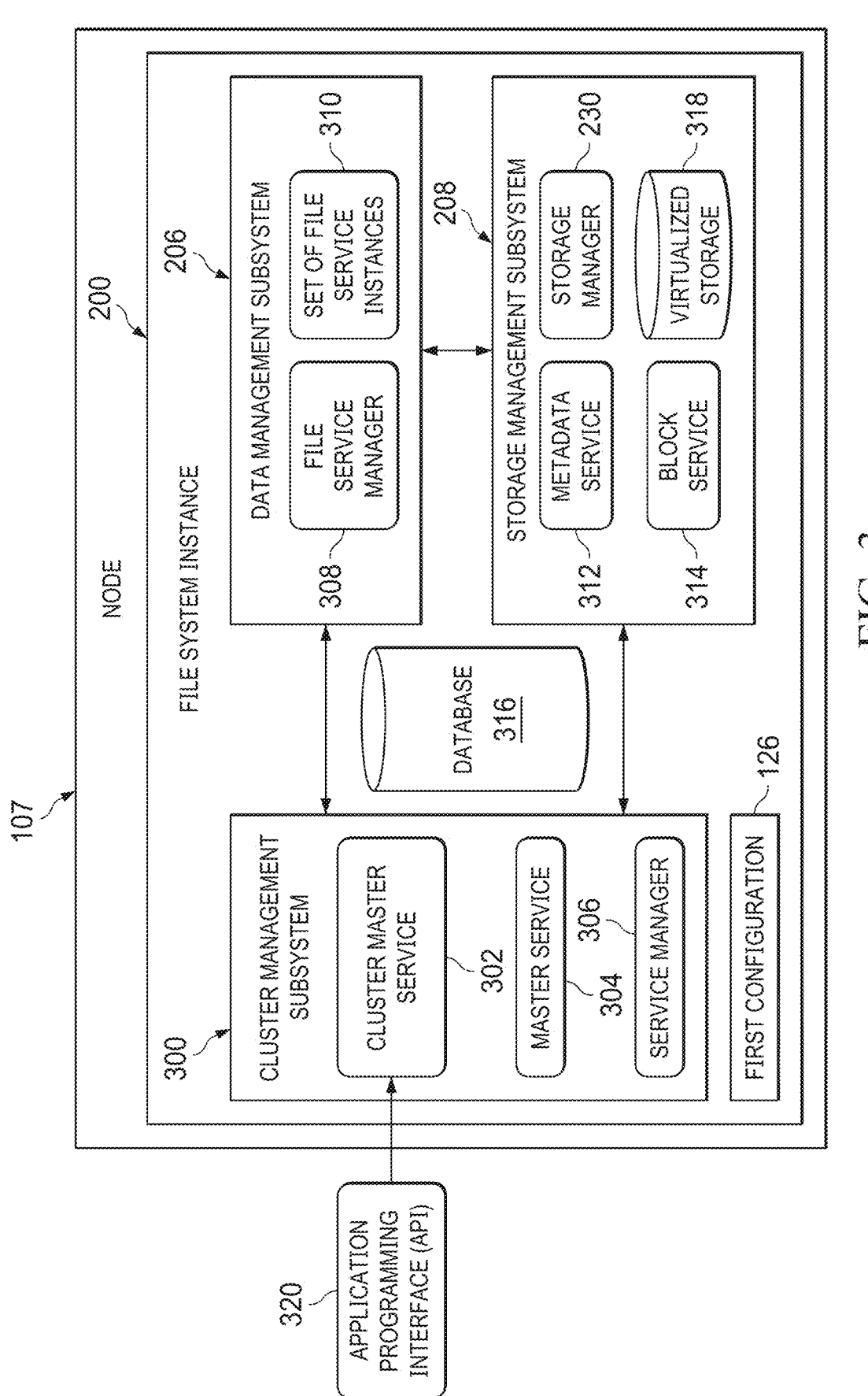
FIG. 3 is a schematic diagram of file system instance deployed on node in accordance with one or more embodiments

FIG. 3 is a schematic diagram of services deployed in file system instance 200 from FIG. 2 in accordance with one or more embodiments. In addition to including data management subsystem 206 and storage management subsystem 208, file system instance 200 includes cluster management subsystem 300. Cluster management subsystem 300 is an instance of cluster management subsystem 118 in FIG. 1.

In one or more embodiments, cluster management subsystem 300 includes cluster master service 302, master service 304, service manager 306, or a combination thereof. In some embodiments, cluster master service 302 may be active in only one node of cluster 104 from FIG. 1 at a time. Cluster master service 302 is used to provide functions that aid in the overall management of cluster 104. For example, cluster master service 302 may provide various functions including, but not limited to, orchestrating garbage collection, cluster wide load balancing, snapshot scheduling, cluster fault monitoring, one or more other functions, or a combination thereof.

Master service 304 may be created at the time node 107 is added to cluster 104. Master service 304 is used to provide functions that aid in the overall management of node 107. For example, master service 304 may provide various functions including, but not limited to, encryption key management, drive management, web server management, certificate management, one or more other functions, or a combination thereof. Further, master service 304 may be used to control or direct service manager 306.

Service manager 306 may be a service that manages the various services deployed in node 107 and memory. Service manager 306 may be used to start, stop, monitor, restart, and/or control in some other manner various services in node 107. Further, service manager 306 may be used to perform shared memory cleanup after a crash of file system instance 200 or node 107.

In one or more embodiments, data management subsystem 206 includes file service manager 308, which may also be referred to as a DMS manager. File service manager 308 serves as a communication gateway between set of file service instances 310 and cluster management subsystem 300. Further, file service manager 308 may be used to start and stop set of file service instances 310 or one or more of the file service instances within set of file service instances 310 in node 107. Each file service instance of set of file service instances 310 may correspond to a set of file system volumes. In some embodiments, the functions provided by file service manager 308 may be implemented partially or fully as part of set of file service instances 310.

In one or more embodiments, storage management subsystem 208 includes storage manager 230, metadata service 312, and block service 314. Metadata service 312 is used to look up and manage the metadata in node metadata block store 222. Further, metadata service 312 may be used to provide functions that include, for example, without limitation, compression, block hash computation, write ordering, disaster or failover recovery operations, metadata syncing, synchronous replication capabilities within cluster 104 and between cluster 104 and one or more other clusters, one or more other functions, or a combination thereof. In some embodiments, a single instance of metadata service 312 is deployed as part of file system instance 200.

In one or more embodiments, block service 314 is used to manage node data block store 224. For example, block service 314 may be used to store and retrieve data that is indexed by a computational hash of the data block. In some embodiments, more than one instance of block service 314 may be deployed as part of file system instance 200. Block service 314 may provide functions including, for example, without limitation, deduplication of blocks across cluster 104, disaster or failover recovery operations, removal of unused or overwritten blocks via garbage collection operations, and other operations.

In various embodiments, file system instance 200 further includes database 316. Database 316 may also be referred to as a cluster database. Database 316 is used to store and retrieve various types of information (e.g., configuration information) about cluster 104. This information may include, for example, information about first configuration 126, node 107, file system volume 234, set of storage devices 108, or a combination thereof.

The initial startup of file system instance 200 may include starting up master service 304 and connecting master service 304 to database 316. Further, the initial startup may include master service 304 starting up service manager 306, which in turn, may then be responsible for starting and monitoring all other services of file system instance 200. In one or more embodiments, service manager 306 waits for storage devices to appear and may initiate actions that unlock these storage devices if they are encrypted. Storage manager 230 is used to take ownership of these storage devices for node 107 and mount the data in virtualized storage 318. Virtualized storage 318 may include, for example, without limitation, a virtualization of the storage devices attached to node 107.

Virtualized storage 318 may include, for example, RAID storage. The initial startup may further include service manager 306 initializing metadata service 312 and block service 314. Because file system instance 200 is started having first configuration 126, service manager 306 may also initialize file service manager 308, which may, in turn, start set of file service instances 310.

Figure 4:
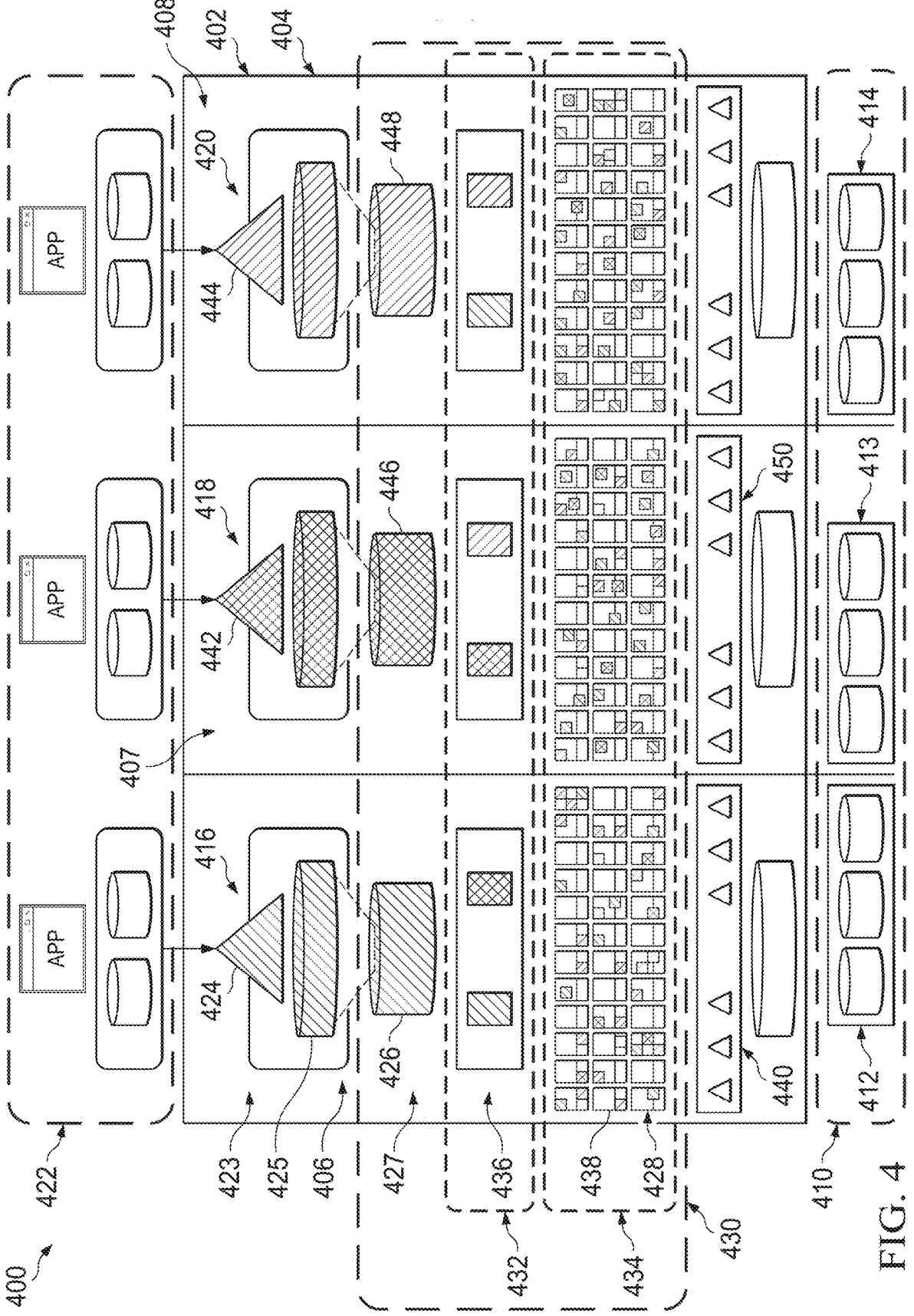
FIG. 4 is a schematic diagram of a distributed file system in accordance with one or more embodiments.

FIG. 4 is a schematic diagram of a distributed file system in accordance with one or more embodiments. Distributed file system 400 may be one example of an implementation for distributed file system 102 in FIG. 1. Distributed file system 400 is implemented across cluster 402 of nodes 404, which include node 406 (e.g., node 1), node 407 (e.g., node 4), and node 408 (e.g., node 3 or node n). Nodes 404 may include 4 nodes, 40 nodes, 60 nodes, 100 nodes, 400 nodes, or some other number of nodes. Cluster 402 and nodes 404 are examples of implementations for cluster 104 and nodes 105, respectively, in FIG. 1.

Each of nodes 404 is associated with (e.g., connected to and in communication with) a corresponding portion of storage 410. Storage 410 is one example of an implementation for storage 103 or at least a portion of storage 103 in FIG. 1. For example, node 406 is associated with set of storage devices 412, node 407 is associated with set of storage devices 413, and node 408 is associated with set of storage devices 414.

Distributed file system 400 includes file system instance 416, file system instance 418, and file system instance 420 deployed in node 406, node 407, and node 408, respectively. File system instance 416, file system instance 418, and file system instance 420 may be example implementations of instances of file system 110 in FIG. 1.

File system instance 416, file system instance 418, and file system instance 420 expose volumes to one or more clients or applications within application layer 422. Application layer 422 may be one example of an implementation for application layer 132 in FIG. 1. In one or more embodiments, file system instance 416, file system instance 418, and file system instance 420 expose, to clients or applications within application layer 422, volumes that are loosely associated with the underlying storage aggregate.

For example, file system instance 416 may be one example of an implementation for file system instance 200 in FIG. 2. File system instance 416 includes data management subsystem 423 and storage management subsystem 427. Data management subsystem 423 is one example implementation of an instance of data management subsystem 114 in FIG. 1 or one example of an implementation of data management subsystem 206 in FIG. 2. Storage management subsystem 427 may be one example implementation of an instance of storage management subsystem 116 in FIG. 1 or one example of an implementation of storage management subsystem 208 in FIG. 2.

Data management subsystem 423 may expose file system volume 424 to one or more clients or applications. In one or more embodiments, file system volume 424 is a FlexVol® that is mapped (e.g., one-to-one) to logical aggregate 425 that is mapped (e.g., one-to-one) to logical block device 426 of storage management subsystem 427. Logical aggregate 425 is a virtual construct that is mapped to logical block device 426, another virtual construct. Logical block device 426 may be, for example, a logical unit number (LUN) device. File system volume 424 and logical block device 426 are decoupled such that a client or application in application layer 422 may be exposed to file system volume 424 but may not be exposed to logical block device 426.

Storage management subsystem 427 includes node block store 428, which is one example of an implementation for node block store 212 in FIG. 2. Node block store 428 is part of distributed block layer 430 that is present across nodes 404 of cluster 402. Distributed block layer 430 may be one example of an implementation for distributed block layer 215 in FIG. 2. Distributed block layer 430 includes a group of block stores, each of which is a distributed block store that is distributed across or spans cluster 402.

In one or more embodiments, distributed block layer 430 includes metadata block store 432 and data block store 434, each of which is a distributed block store as described above. Metadata block store 432 and data block store 434 may be examples of implementations for metadata block store 218 and data block store 220, respectively, in FIG. 2. Node block store 428 of distributed file system 416 includes the portion of metadata block store 432 and the portion of data block store 434 that are hosted on node 406, which may be, for example, node block metadata store 436 and node block data store 438, respectively.

In one or more embodiments, an input/output (I/O) operation (e.g., for a write request or a read request that is received via application layer 422) is mapped to file system volume 424. The received write or read request may reference both metadata and data, which is mapped to file system metadata and file system data in file system volume 424. In one or more embodiments, the request data and request metadata associated with a given request (read request or write request) forms a data block that has a corresponding logical block address (LBA) within logical block device 426. In other embodiments, the request data and the request metadata form one or more data blocks of logical block device 426 with each data block corresponding to one or more logical block addresses (LBAs) within logical block device 426.

A data block in logical block device 426 may be hashed and stored in data block store 434 based on a block identifier for the data block. The block identifier may be or may be based on, for example, a computed hash value for the data block. The block identifier further maps to a data bucket, as identified by the higher order bits (e.g., the first two bytes) of the block identifier. The data bucket, also called a data bin or bin, is an internal storage container associated with a selected node. The various data buckets in cluster 402 are distributed (e.g., uniformly distributed) across nodes 404 to balance capacity utilization across nodes 404 and maintain data availability within cluster 402. The lower order bits (e.g., the remainder of the bytes) of the block identifier identify the location within the node block data store (e.g., node block data store 438) of the selected node where the data block resides. In other words, the lower order bits identify where the data block is stored on-disk within the node to which it maps.

This distribution across nodes 404 may be formed based on, for example, global capacity balancing algorithms that may, in some embodiments, also consider other heuristics (e.g., a level of protection offered by each node). Node block metadata store 436 contains a mapping of the relevant LBA for the data block of logical block device 426 to its corresponding block identifier. As described above, the block identifier may be a computed hash value. In some embodiments, logical block device 426 may also include metadata that is stored in node block metadata store 436. Although node block metadata store 436 and node block data store 438 are shown as being separate stores or layers, in other embodiments, node block metadata store 436 and node block data store 438 may be integrated in some manner (e.g., collapsed into a single block store or layer).

Storage management subsystem 427 further includes storage manager 440, which is one example of an implementation for storage manager. Storage manager 440 provides a mapping between node block store 428 and set of storage devices 412 associated with node 406. For example, storage manager 440 implements a key value interface for storing blocks for node block data store 428. Further, storage manager 440 is used to manage RAID functionality. In one or more embodiments, storage manager 440 is implemented using a storage management service. In various embodiments, storage management subsystem 427 may include one or more metadata (or metadata block) services, one or more data (or data block) services, one or more replication services, or a combination thereof.

In addition to file system instance 416 exposing file system volume 424 to application layer 422, file system instance 418 exposes file system volume 442 and file system instance 420 exposes file system volume 444 to application layer 422. Each of file system volume 424, file system volume 442, and file system volume 444 is disaggregated or decoupled from the underlying logical block device. The data blocks for each of file system volume 424, file system volume 442, and file system volume 444 are stored in a distributed manner across distributed block layer 430 of cluster 402.

For example, file system volume 424, file system volume 442, and file system volume 444 may ultimately map to logical block device 426, logical block device 446, and logical block device 448, respectively. The file system metadata and the file system data from file system volume 424, file system volume 442, and file system volume 444 are both stored in data blocks corresponding to logical block device 426, logical block device 446, and logical block device 448. In one or more embodiments, these data blocks in distributed block layer 430 are uniformly distributed across nodes 404 of cluster 402. Further, in various embodiments, each data block corresponding to one of logical block device 426, logical block device 446, and logical block device 448 may be protected via replication and via virtualized storage. For example, a data block of logical block device 446 of node 407 may be replicated on at least one other node in cluster 404 and may be further protected by virtualized storage 450 within the same node 407.

In other embodiments, the disaggregation or decoupling of data management subsystem 423 and storage management subsystem 427 may enable data management subsystem 423 to be run within application layer 422. For example, data management subsystem 423 may be run as a library that can be statically or dynamically linked to an application within application layer 422 to allow data management system 423 to adhere closely to application failover and data redundancy semantics. Distributed block layer 430 may be accessible from all applications within application layer 422, which may help make failover operations seamless and copy free.

In one or more embodiments, distributed file system 400 may make decisions about how nodes 404 of cluster 402 serve a given file share or how resources available to each of nodes 404 are used. For example, distributed file system 400 may determine which node of nodes 404 will serve a given file share based on the throughput required from the file share as well as how the current load is distributed across cluster 402. Distributed file system 400 may use dynamic load balancing based on various policies including, for example, but not limited to, QoS policies, which may be set for the given file system instance (e.g., file system instance 416) within cluster 402.

Figure 5:
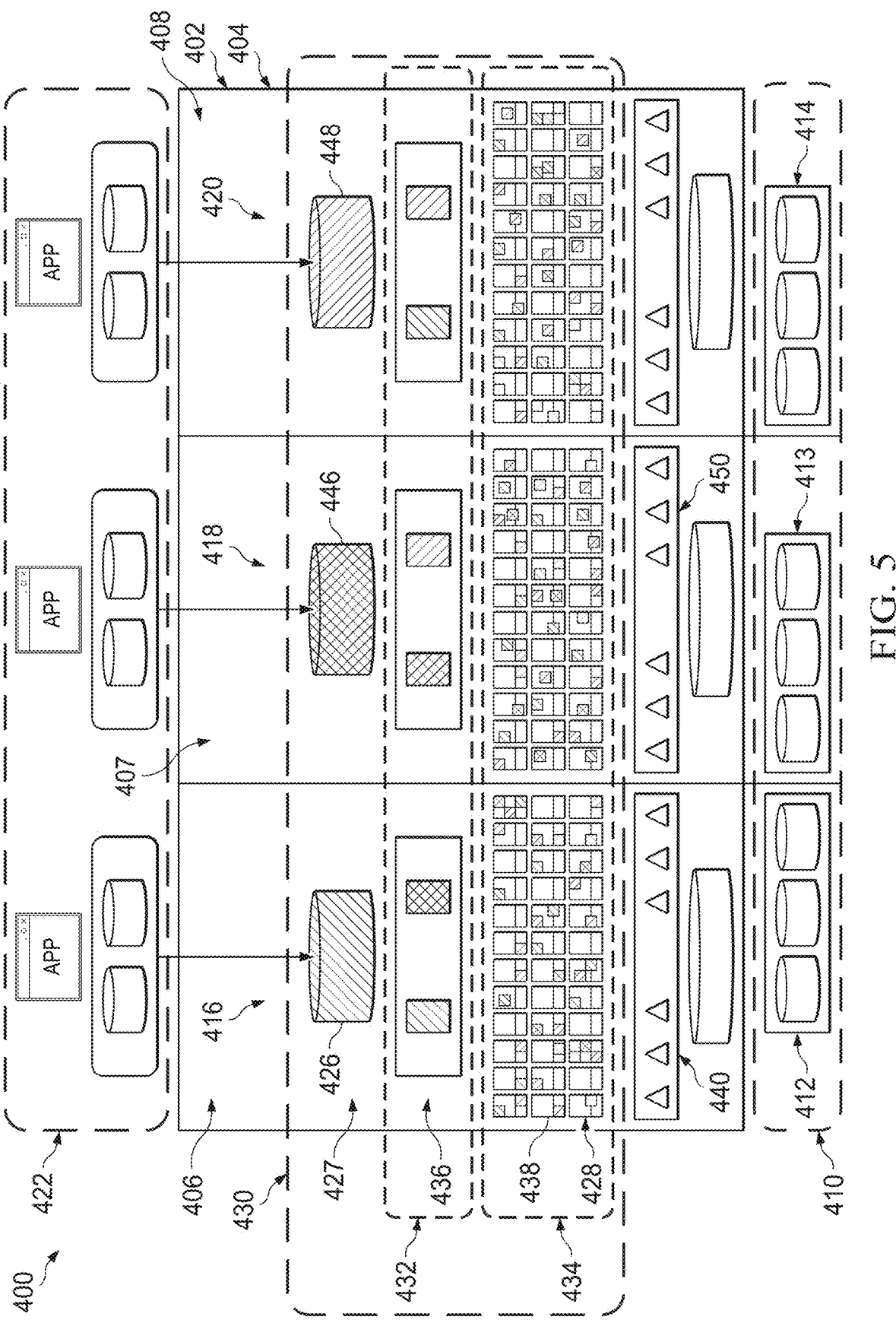
FIG. 5 is another schematic diagram of distributed file system in accordance with one or more embodiments.

FIG. 5 is another schematic diagram of distributed file system 400 from FIG. 4 in accordance with one or more embodiments. In one or more embodiments, file system instance 416, file system instance 418, and file system instance 420 of distributed file system 400 are implemented without data management subsystems (e.g., without data management subsystem 423, data management subsystem 442, or data management subsystem 444 in FIG. 4). This configuration of distributed file system 400 may enable direct communications between application layer 422 and the storage management subsystems (e.g., storage management subsystem 427) of distributed file system 400. This type of configuration for distributed file system 400 is enabled because of the disaggregation (or decoupling) of the data management and storage management layers of distributed file system 400.

Figure 6:
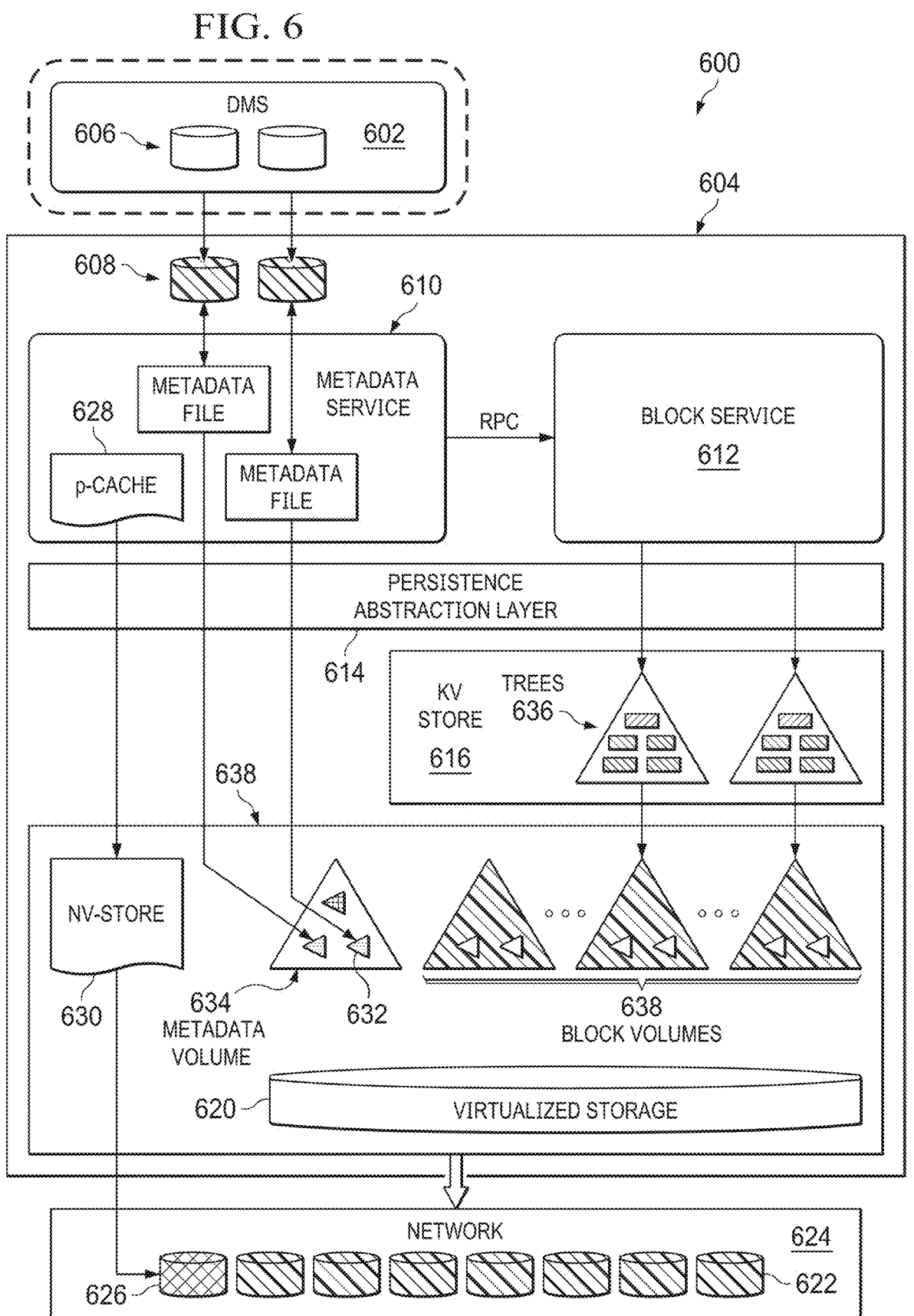
FIG. 6 is a schematic diagram of a portion of a file system in accordance with one or more embodiments.

FIG. 6 is a schematic diagram of a portion of a file system instance in accordance with one or more embodiments. File system instance 600 is one example of an implementation for an instance of file system 110 in FIG. 1. File system instance 600 is one example of an implementation for file system instance 200 in FIG. 2.

File system instance 600 includes data management subsystem 602 and storage management subsystem 604. Data management subsystem 602 may expose file system volume 606 to clients or applications. File system volume 606 includes file system data and file system metadata. In one or more embodiments, file system volume 606 is a flexible volume (e.g., FlexVol®). File system volume 606 may be one of any number of volumes exposed at data management subsystem 602. File system volume 606 may map directly or indirectly to logical block device 608 in storage management subsystem 604. Logical block device 608 may include metadata and data in which the data of logical block device 608 includes both the file system data and the file system metadata of the corresponding file system volume 606. Logical block device 608 may be, for example, a LUN. The file system metadata and the file system data of file system volume 606 may be stored in hash form in the various logical block addresses (LBAs)) of logical block device 608. Further, logical block device 608 may be one of any number of logical block devices on node 406 and, in some embodiments, one of many (e.g., hundreds, thousands, tens of thousands, etc.) logical block devices in the cluster.

Storage management subsystem 604 may include, for example, without limitation, metadata service 610 and block service 612. Metadata service 610, which may be one example of an implementation of at least a portion of metadata block store 218 in FIG. 2, manages metadata services for logical block device 608. Block service 612, which may be one example of an implementation of at least a portion of data block store 220 in FIG. 2, stores the data (e.g., file system data and file system metadata) of logical block device 608.

The metadata of logical block device 608 maps the LBA of the data of logical block device 608 (e.g., the file system data and/or file system metadata) to a block identifier. The block identifier is based on (e.g., may be) the hash value that is computed for the data of logical block device 608. The LBA-to-block identifier mapping is stored in metadata object 632. There may be one metadata object 632 per logical block device 608. Metadata object 632 may be replicated (e.g., helix-replicated) on at least one other node in the cluster.

For example, metadata service 610 may communicate over persistence abstraction layer (PAL) 614 with key-value (KV) store 616 of storage manager 618. Storage manager 618 uses virtualized storage 620 (e.g., RAID) to manage storage 622. Storage 622 may include, for example, data storage devices 624 and logging storage device 626. Logging storage device 626 may be used to log the data and metadata from incoming write requests and may be implemented using, for example, NVRAM. Metadata service 610 may store the file system data and file system metadata from an incoming write request in a primary cache 628, which maps to logical store 630, which in turn, is able to read from and write to logging storage device 626.

As described above, metadata service 610 may store the mapping of LBAs in logical block device 608 to block identifiers in, for example, without limitation, metadata object 632, which corresponds to or is otherwise designated for logical block device 608. Metadata object 632 is stored in metadata volume 634, which may include other metadata objects corresponding to other logical block devices. In some embodiments, metadata object 632 is referred to as a slice file and metadata volume 634 is referred to as a slice volume. In various embodiments, metadata object 632 is replicated to at least one other node in the cluster. The number of times metadata object 632 is replicated may be referred to as a replication factor.

Metadata object 632 enables the looking up of a block identifier that maps to an LBA of logical block device 608. KV store 616 stores data blocks as "values" and their respective block identifiers as "keys." KV store 616 may include, for example, tree 636. In one or more embodiments, tree 636 is implemented using a log-structured merge-tree (LSM-tree). KV store 616 uses the underlying block volumes 638 managed by storage manager 618 to store keys and values. KV store 616 may keep the keys and values separately on different files in block volumes 638 and may use metadata to point to the data file and offset for a given key. Block volumes 638 may be hosted by virtualized storage 620 that is RAID-protected. Keeping the key and value pair separate may enable minimizing write amplification. Minimizing write amplification may enable extending the life of the underlying drives that have finite write cycle limitations. Further, using KV store 616 aids in scalability. KV store 616 improves scalability with a fast key-value style lookup of data. Further, because the "key" in KV store 616 is the hash value (e.g., content hash of the data block), KV store 616 helps in maintaining uniformity of distribution of data blocks across various nodes within the distributed data block store.

Figure 7:
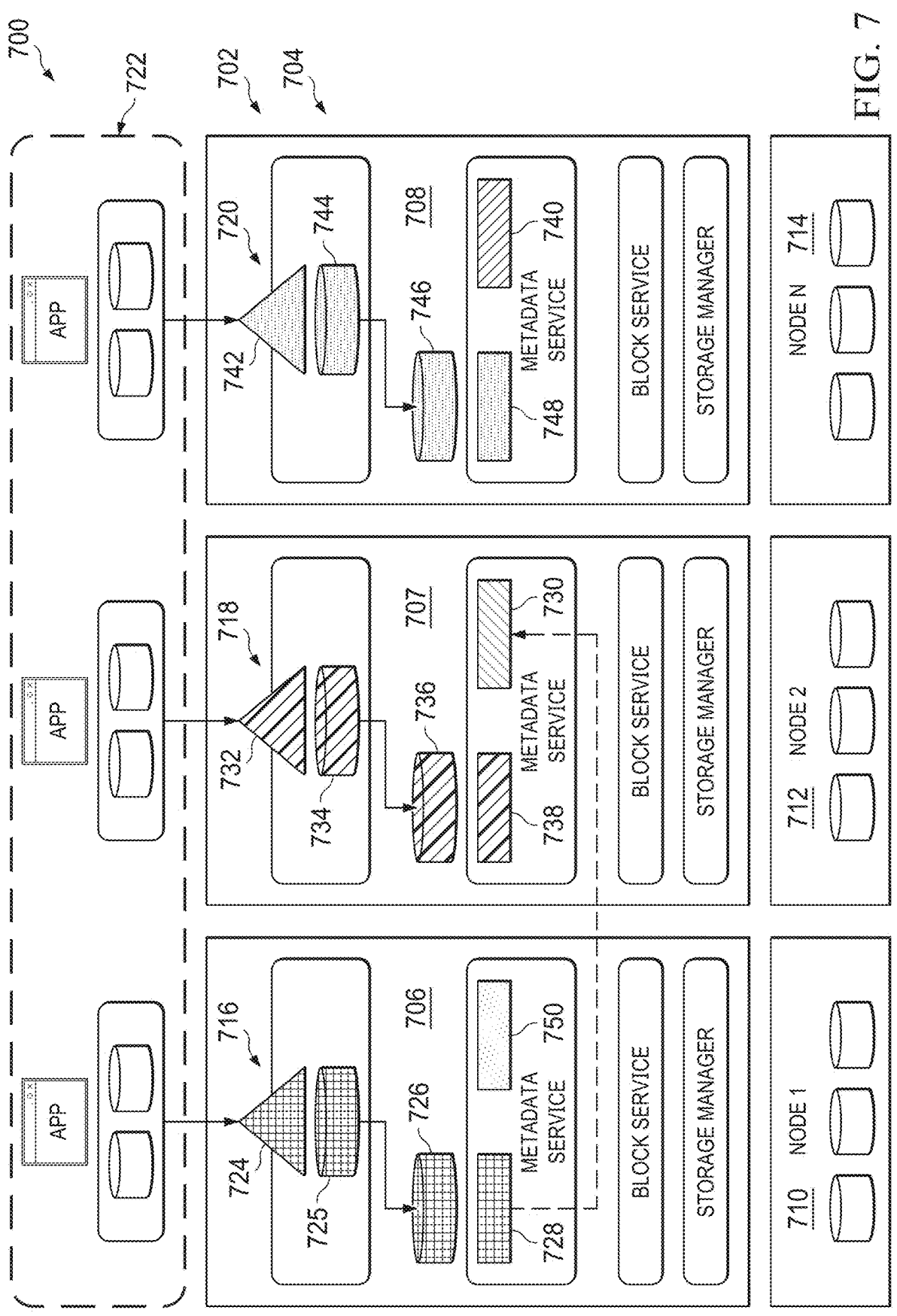
FIG. 7 is a schematic diagram illustrating an example of a configuration of a distributed file system prior to load balancing in accordance with one or more embodiments.

FIG. 7 is a schematic diagram illustrating an example of a configuration of a distributed file system 700 prior to load balancing in accordance with one or more embodiments. Distributed file system 700 may be one example of an implementation for distributed file system 102 in FIG. 1. Distributed file system 700 includes cluster 702 of nodes 704. Nodes 704 may include, for example, node 706, node 707, and none 708, which may be attached to set of storage devices 710, set of storage devices 712, and set of storage devices 714, respectively.

Distributed file system 700 may include file system instance 716, file system instance 718, and file system instance 720, each of which may be one example of an implementation of an instance of file system 110 in FIG. 1. File system instance 716, file system instance 718, and file system instance 720 may expose file system volumes to application layer 722. For example, file system instance 716 may expose file system volume 724 to application layer 722.

File system volume 724 maps to logical aggregate 725, which maps to logical block device 726. Logical block device 726 is associated with metadata object 728, which maps the various LBAs of logical block device 726 to block identifiers (e.g., hash values). These block identifiers identify the individual data blocks across cluster 702 where data is stored. Metadata object 728 in node 706 is a primary metadata object that may be replicated on at least one other node. For example, metadata object 728 is replicated to form replica metadata object 730 in node 707. A replica metadata object may also be referred to as a secondary metadata object.

Similarly, file system instance 718 may expose file system volume 732 to application layer 722. File system volume 732 maps to logical aggregate 734, which maps to logical block device 736. Logical block device 736 is associated with metadata object 738, which maps the various LBAs of logical block device 736 to block identifiers (e.g., hash values). These block identifiers identify the individual data blocks across cluster 702 where data is stored. Metadata object 738 in node 707 is a primary metadata object that may be replicated on at least one other node. For example, metadata object 738 is replicated to form replica metadata object 740 in node 708.

Further, file system instance 720 may expose file system volume 742 to application layer 722. File system volume 742 maps to logical aggregate 744, which maps to logical block device 746. Logical block device 746 is associated with metadata object 748, which maps the various LBAs of logical block device 746 to block identifiers (e.g., hash values). These block identifiers identify the individual data blocks across cluster 702 where data is stored. Metadata object 748 in node 708 is a primary metadata object that may be replicated on at least one other node. For example, metadata object 748 is replicated to form replica metadata object 750 in node 706.

In some embodiments, an event may occur that is a trigger indicating that load balancing should be performed. Load balancing may involve relocating volumes from one node to another node. Load balancing is described in further detail in FIG. 8 below.

Figure 8:
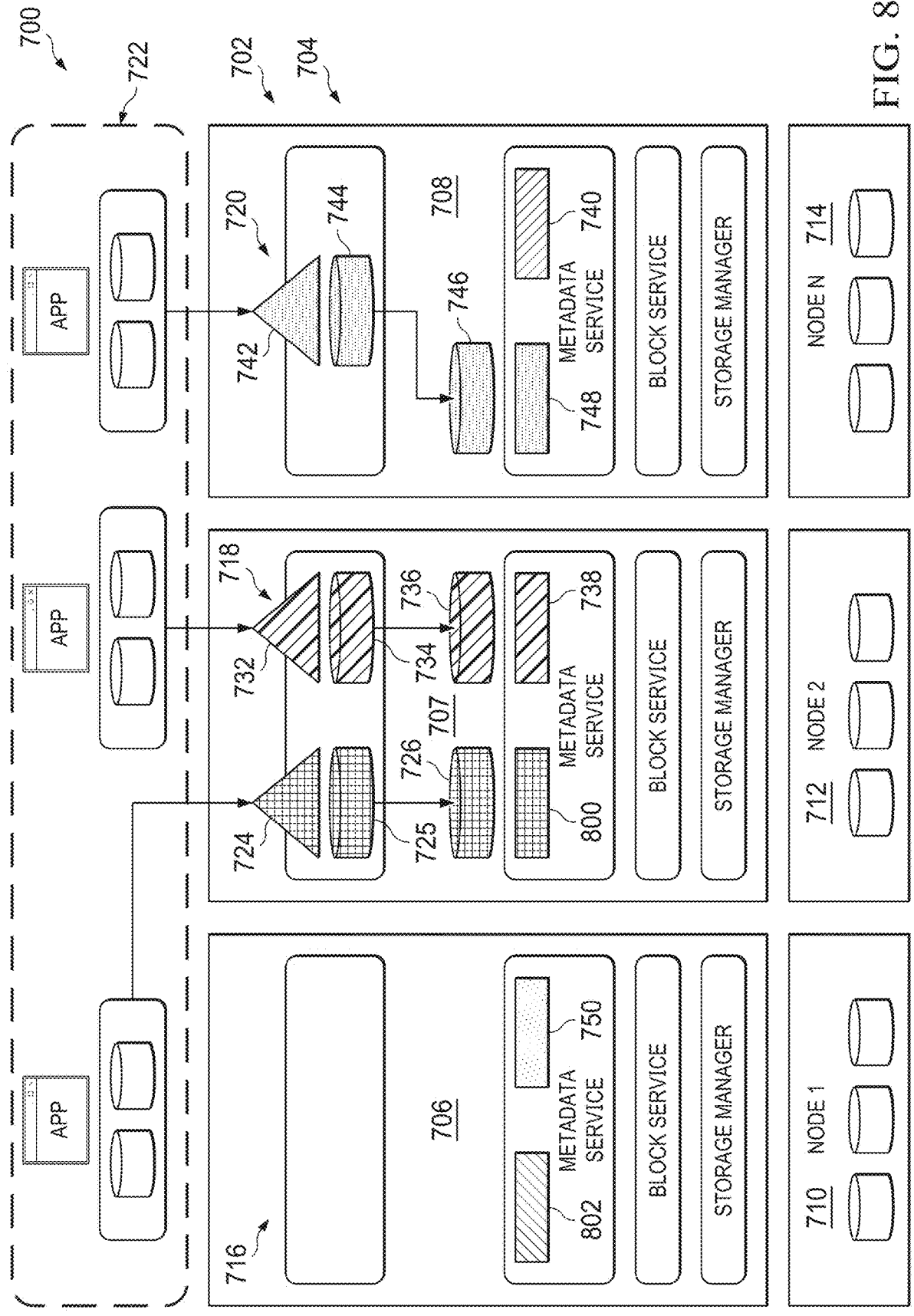
FIG. 8 is a schematic diagram illustrating an example of a configuration of distributed file system after load balancing in accordance with one or more embodiments.

FIG. 8 is a schematic diagram illustrating an example of a configuration of distributed file system 700 from FIG. 7 after load balancing has been performed in accordance with one or more embodiments. Load balancing may be performed in response to one or more triggering events. Load balancing may be used to ensure that usage of computing resources (e.g., CPU resources, memory, etc.) is balanced across cluster 702.

In one or more embodiments, load balancing may be performed if node 706 fails or is removed from cluster 702. As depicted, file system volume 724 has been relocated from node 706 to node 707. Further, logical aggregate 725 and logical block device 726 have been relocated from node 706 to node 707. In one or more embodiments, this relocation may be performed by turning file system volume 724, logical aggregate 725, and logical block device 726 offline at node 706 and bringing these items online at node 707.

Still further, new metadata object 800 is assigned to logical block device 726 on node 707. This assignment may be performed in various ways. In some embodiments, the relocation of file system volume 724, logical aggregate 725, and logical block device 726 to node 707 is performed because node 707 already contains replica metadata object 730 in FIG. 7. In such cases, replica metadata object 730 in FIG. 7 may be promoted to or designated as new primary metadata object 800 corresponding to logical block device 726. In some embodiments, the original primary metadata object 728 in FIG. 7 may be demoted to replica metadata object 802. In the case of a failover of node 706 that triggered the load balancing, replica metadata object 802 may be initialized upon the restarting of node 706.

In other embodiments, when node 707 does not already include replica metadata object 730, the original primary metadata object 728 in FIG. 7 may be moved from node 706 to node 708 to become the new primary metadata object 800 or may be copied over from node 706 to node 708 to become the new primary metadata object 800. In some embodiments, new primary metadata object 800 may be copied over into a new node (e.g., node 708 or another node in cluster 702) to form a new replica metadata object (or secondary metadata object).

Figure 9:
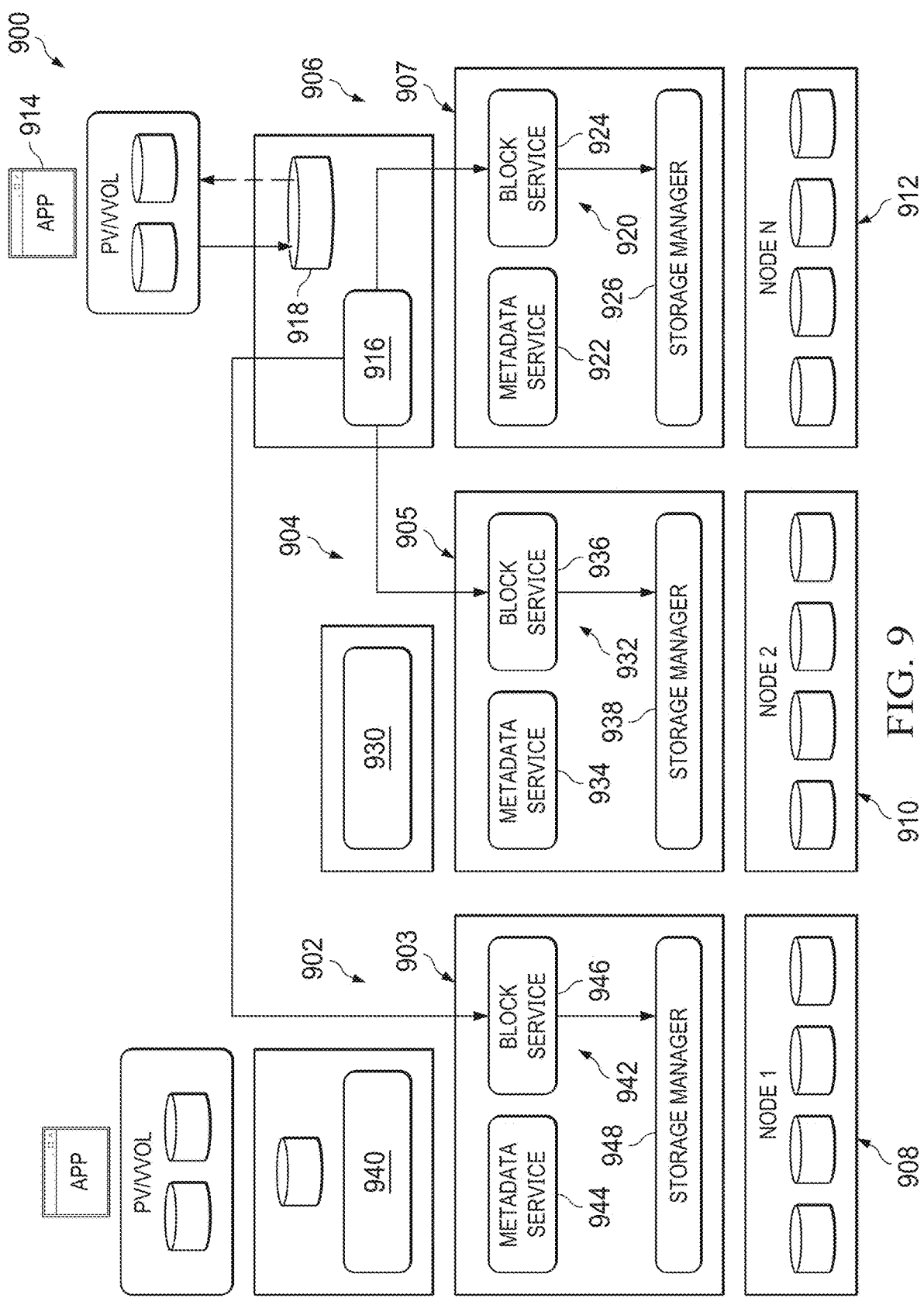
FIG. 9 is a schematic diagram of a distributed file system utilizing a fast write path in accordance with one or more embodiments.

FIG. 9 is a schematic diagram of a distributed file system utilizing a fast read path in accordance with one or more embodiments. Distributed file system 900 may be one example of an implementation for distributed file system 102 in FIGS. 1 and 2. Distributed file system 900 includes file system instance 902, file system instance 904, and file system instance 906 deployed on node 903, node 905, and node 907, respectively. Node 903, node 905, and node 907 are attached to set of storage devices 908, set of storage devices 910, and set of storage devices 912, respectively.

File system instance 906 may receive a read request from application 914 at data management subsystem 916 of file system instance 906. This read request may include, for example, a volume identifier that identifies a volume, such as file system volume 918, from which data is to be read. In one or more embodiments, the read request identifies a particular data block in a file. Data management subsystem 916 may use, for example, a file service instance (e.g., one of set of file service instances 310 in FIG. 3) to service the read request.

The read request is processed and information in a tree of indirect blocks corresponding to the file is used to locate a block number for the data block holding the requested data. In various embodiments, when the data in the particular data block is being requested for the first time, this block number may be a physical volume block number (pvbn) that identifies the data block in a logical aggregate. This data block may then be mapped to an LBA in a logical block device in storage management subsystem 920.

In one or more embodiments, metadata service 922 in storage management subsystem 920 looks up a mapping of the LBA to a block identifier using a metadata object corresponding to the logical block device. This block identifier, which may be a hash, identifies the location of the one or more data blocks containing the data to be read. Block service 924 and storage manager 926 may use the block identifier to retrieve the data to be read. In some embodiments, the block identifier determines that the location of the one or more data blocks is on a node in distributed file system 900 other than node 907. The data that is read may then be sent to application 914 via data management subsystem 916.

In these examples, the block identifier may be stored within file system indirect blocks to enable faster read times for that of the one or more data blocks. For example, in one or more embodiments, the pvbn in the tree of indirect blocks may be replaced with the block identifier for the data to be read. Thus, for a read request for that data, data management subsystem 916 may use the block identifier to directly access the one or more data blocks holding that data without having to go through metadata service 922. Upon a next read request for the same data, data management subsystem 916 may be able to locate the data block cached within the file system buffer cache for data management subsystem 916 using the block identifier. In this manner, distributed file system 900 enables a fast read path.

File system instance 904 and file system instance 902 may be implemented in a manner similar file system instance 906. File system instance 904 includes data management subsystem 930 and storage management subsystem 932, with storage management subsystem 932 including metadata service 934, block service 936, and storage manager 938. File system instance 902 includes data management subsystem 940 and storage management subsystem 942, with storage management subsystem 942 including metadata service 944, block service 946, and storage manager 948.

Figure 10:
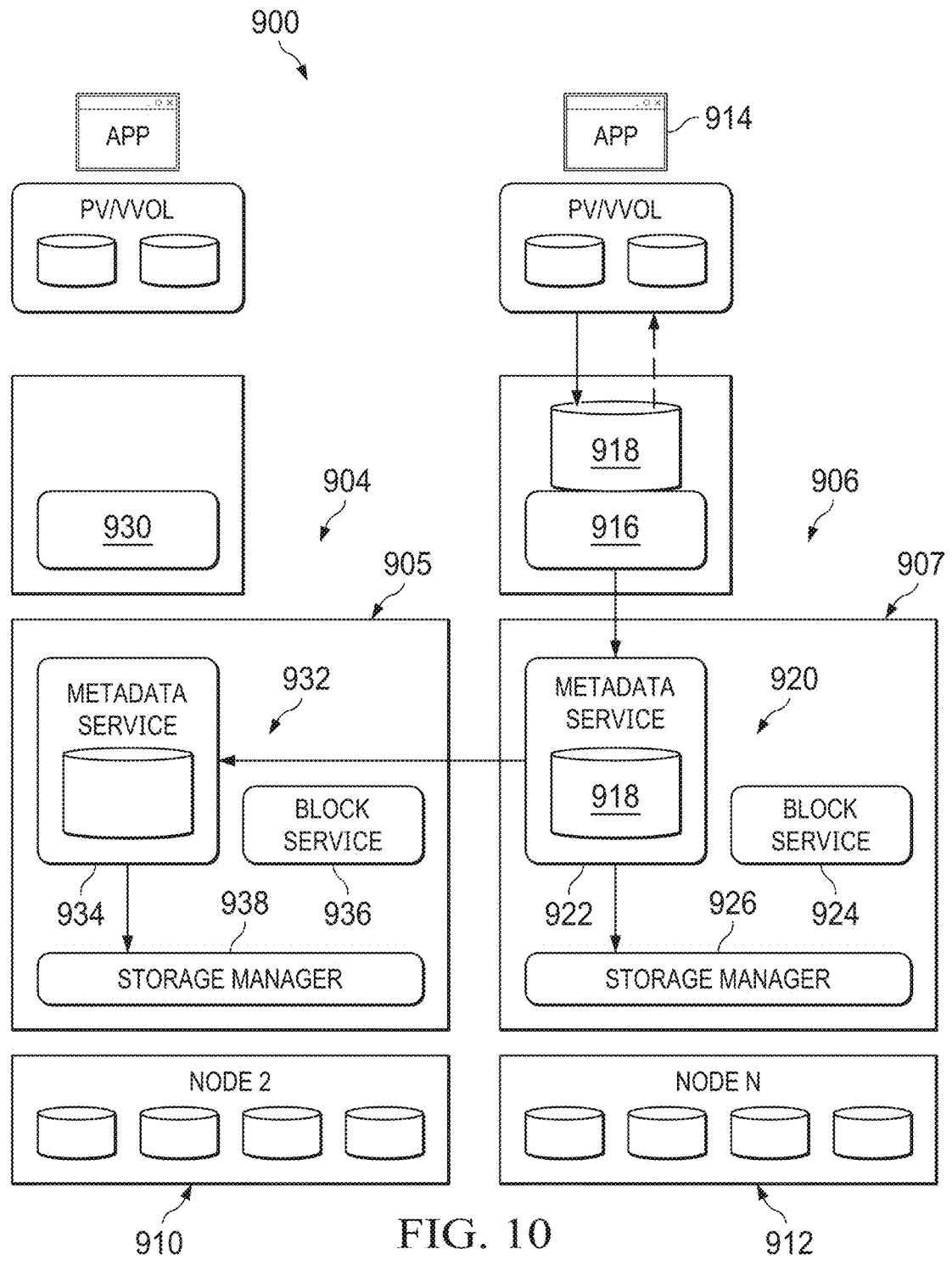
FIG. 10 is a schematic diagram of a distributed file system utilizing a fast read path in accordance with one or more embodiments.

FIG. 10 is a schematic diagram of a distributed file system 900 from FIG. 9 utilizing a fast write path in accordance with one or more embodiments. In FIG. 10, file system instance 904 deployed on node 905 and file system instance 906 deployed on node 907 are shown.

Data management subsystem 916 may receive a write request that includes a volume identifier. The volume identifier may be mapped to file system volume 918. File system volume 918 is mapped to a logical block device in storage management subsystem 920, with the logical block device having metadata object 1000 corresponding to the logical block device. Having metadata object 1000 co-located on a same node as file system volume 918 removes the need for a "network hop" to access the storage management subsystem on a different node. This type of co-location may reduce write latency.

While traditional systems typically map many file system volumes to a single aggregate, distributed file system 900 ensures that each file system volume (e.g., file system volume 918) is hosted on its own private logical aggregate. Further, while traditional systems may map an aggregate to physical entities (e.g., disks and disk groups), distributed file system 900 maps the logical aggregate to a logical block device. Further, in distributed file system 900, no other logical aggregate is allowed to map to the same logical block device. Creating this hierarchy enables establishing control over the placement of the related (or dependent) objects that these entities need.

For example, because there is only 1 file system volume mapping to a logical aggregate, a dependency can be created that the file system volume and the logical aggregate be on the same node. Further, because there is only 1 logical aggregate mapping to a logical block device, a dependency can be created that the logical aggregate and the logical block device be on the same node. The metadata object for the logical block device resides on the same node as the logical block device. Thus, by creating this hierarchy and these dependencies, the file system volume and the logical block device are required to reside on the same node, which means that the metadata object for the logical block device resides on the same node as the file system volume. Thus, the updates to the metadata object that are needed for every file system write IO are made locally on the same node as the file system volume, thereby reducing write latency FIG. 11 is a flow diagram illustrating examples of operations in a process 1100 for managing data storage using a distributed file system in accordance with one or more embodiments. It is understood that the process 1100 may be modified by, for example, but not limited to, the addition of one or more other operations. Process 1100 may be implemented using, for example, without limitation, distributed storage management system 100 in FIG. 1. In one or more embodiments, process 1100 may be implemented using distributed file system 102 in FIG. 1 or distributed file system 400 in FIG. 4.

Process 1100 begins by identifying a file system volume associated with a write request received at a data management subsystem (operation 1102). The data management subsystem may be deployed on a node in a cluster of a distributed storage management system, such as, for example, cluster 104 of distributed storage management system 100 in FIG. 1. The file system volume may be exposed to the application layer. The data management subsystem may take the form of, for example, data management subsystem 423 in FIG. 4. The file system volume may take the form of, for example, file system volume 424 in FIG. 4.

A logical block device associated with the file system volume is identified (operation 1104). Operation 1104 may be performed by mapping the file system volume to the logical block device. This mapping may be performed by, for example, mapping a data block in the file system volume to a data block in the logical aggregate. The data block in the logical aggregate may then be mapped to an LBA of the logical block device into which the data is to be written. The logical block device may take the form of, for example, logical block device 426 in FIG. 4.

A plurality of data blocks is formed based on the write request (operation 1106). In operation 1106, a block identifier for each of the plurality of data blocks may be stored in a metadata object in a metadata object corresponding to the logical block device. The metadata object may take the form of, for example, metadata object 632 in FIG. 6.

The plurality of data blocks is distributed across a plurality of node block stores in a distributed block layer of a storage management subsystem of the distributed file system (operation 1108). Each of the plurality of node block stores corresponds to a different node of a plurality of nodes in the distributed storage system. The storage management subsystem operates separately from but in communication with the data management subsystem. In one or more embodiments, the plurality of data blocks is distributed uniformly or equally among the plurality of nodes. The storage management subsystem may take the form of, for example, storage management subsystem 427 in FIG. 4. The distributed block layer may take the form of, for example, distributed block layer 430 in FIG. 4. Node block store 428 in FIG. 4 may be one example of an implementation for a node block store in the plurality of node block stores.

Operation 1108 may be performed based on a capacity of each node of the plurality of nodes such that computing resources used to service the file system volume are distributed equally across the plurality of nodes. In one or more embodiments, operation 1108 may include distributing the plurality of data blocks across the plurality of node block stores according to a distribution pattern selected based on a capacity associated with each node of the plurality of nodes. This distribution pattern may be selected as the most efficient distribution pattern of a plurality of potential distribution patterns. For example, the plurality of data blocks may be distributed in various ways, but operation 1108 may select the distribution pattern that provides the most efficiency, including with respect to load-balancing.

FIG. 12 is a flow diagram illustrating examples of operations in a process 1200 for managing data storage using a distributed file system in accordance with one or more embodiments. It is understood that the process 1200 may be modified by, for example, but not limited to, the addition of one or more other operations. Process 1200 may be implemented using, for example, without limitation, distributed storage management system 100 in FIG. 1. In one or more embodiments, process 1200 may be implemented using distributed file system 102 in FIG. 1 or distributed file system 400 in FIG. 4.

Process 1200 may begin by deploying, virtually, a file system instance in a node of a distributed storage management system, the file system instance having a configuration that includes a set of services corresponding to a cluster management subsystem and a storage management subsystem (operation 1202). The storage management subsystem is disaggregated from a data management subsystem of the distributed storage management system such that the storage management subsystem is configured to operate independently of the data management subsystem and is configured receive requests from an application layer. The storage management subsystem and the data management subsystem may be implemented using, for example, storage management subsystem 427 in FIG. 4 and data management subsystem 423 in FIG. 4, respectively.

A demand for an additional service corresponding to the data management subsystem is determined to be present (operation 1204). In some embodiments, this demand may be for all services supported by the data management subsystem. A service may be, for example, a file service instance. A service may be, for example, a service relating to compliance management, backup management, management of volume policies, snapshots, clones, temperature-based tiering, cloud backup, another type of function, or a combination thereof.

A determination is made as to whether a set of resources corresponding to the additional service is available (operation 1206). The set of resources may include, for example, a node, a service, one or more computing resources (e.g., CPU resources, memory, network interfaces, devices etc.), one or more other types of resources, or a combination thereof. If the set of resources is available, the additional service is deployed virtually to meet the demand for the additional service in response to determining that the set of resources is available (operation 1206). For example, if the demand is for an instantiation of the data management subsystem, operation 1206 is performed if a client-side network interface is detected.

With reference again to operation 1206, if the set of resources is not available, the additional service is prevented from starting (operation 1210). For example, if the demand is for an instantiation of the storage management subsystem, the master service of the node may prevent the storage management subsystem from starting if no storage devices are detected as being attached directly to the node or connected via a network. In this manner, the file system instance has a software service-based architecture that is composable. The software service-based architecture enables services to be started and stopped on-demand depending on the needs of and resource availability of the cluster. Further, by allowing the data management subsystem and the storage management subsystem to be started and stopped independently of each other, computing resources may be conserved.

FIG. 13 is a flow diagram illustrating examples of operations in a process 1300 for performing relocation across a distributed file system in accordance with one or more embodiments. It is understood that the process 1300 may be modified by, for example, but not limited to, the addition of one or more other operations. Process 1300 may be implemented using, for example, without limitation, distributed storage management system 100 in FIG. 1. In one or more embodiments, process 1300 may be implemented using distributed file system 102 in FIG. 1 or distributed file system 400 in FIG. 4.

Process 1300 may include detecting a relocation event (or condition) that indicates a relocation is to be initialized (operation 1302). The event may be, for example, a failure event (or condition) or a load balancing event (or condition). A failure event may be, for example, a failure of a node or a failure of one or more services on the node. A load balancing event may be, for example, without limitation, the addition of a node to a cluster, an upgrading of a node in the cluster, a removal of a node from the cluster, a change in the computing resources of a node in the cluster, a change in file system volume performance characteristics (e.g., via increase of the input/output operations per second (IOPS) requirements of one or more file system volumes), some other type of event, or a combination thereof. Operation 1302 may be performed by, for example, cluster management subsystem 300 in FIG. 3. Cluster management subsystem 300 may run global load balancers as part of, for example, cluster master service 302 to manage volume assignment to a given node as well as load balancing across the cluster.

The relocation may be initialized by identifying a destination node for the relocation of a corresponding set of objects in a cluster database, the corresponding set of objects including a logical block device, a corresponding logical aggregate, and a corresponding file system volume (operation 1304). The cluster database manages the node locations for all logical block devices, all logical aggregates, and all file system volumes. The cluster database may be managed by, for example, cluster master service 302 of cluster management subsystem 300 in FIG. 3. Operation 1304 may be initiated by updating the destination node location for each of the corresponding set of objects within the cluster database. The corresponding set of objects include a logical block device, a corresponding logical aggregate, and a corresponding file system volume. The logical block device may take the form of, for example, logical block device 426 in FIG. 4. The corresponding file system volume may take the form of, for example, file system volume 424 in FIG. 4. The corresponding logical aggregate may take the form of, for example, logical aggregate 425 in FIG. 4.

Next, the state of each of the corresponding set of objects is changed to offline (operation 1306). Operation 1306 may be performed by a service such as, for example, master service 304 of cluster management subsystem 300 in FIG. 3. For example, one or more global load balancers within the cluster master service 302 may be used to manage the state (e.g., offline/online) of each object. Changing the state of each of the corresponding set of objects may be triggered by, for example, a notification that is generated in response to the destination node being updated in the cluster database.

The corresponding set of objects is then relocated to the destination node (operation 1308). For example, the relocation may be performed by moving the corresponding set of objects from a first node (the originating node) to a second node (the destination node). In one or more embodiments, operation 1308 includes relocating the logical block device to the destination node first, relocating the logical aggregate to the destination node next, and then relocating the file system volume to the destination node. The relocation of the corresponding set of objects does not cause any data movement across the nodes. In some embodiments, operation 1308 includes relocating metadata associated with the logical block device to the destination node.

Anew primary metadata object corresponding to the logical block device is formed based on relocation of the logical block device (operation 1310). In some embodiments, the destination node hosts a replica of an original primary metadata object corresponding to the logical block device. In such embodiments, forming the new primary metadata object may include promoting the replica to be the new primary metadata object. In other embodiments, forming the new primary metadata object includes moving an original primary metadata object corresponding to the logical block device to the destination node to form the new primary metadata object corresponding to the logical block device.

The state of each of the corresponding set of objects is changed to online (operation 1312). Bringing the corresponding set of objects online signals the end of the relocation. Operation 1312 may be orchestrated by, for example, the cluster master service.

FIG. 14 is a flow diagram illustrating examples of operations in a process 1400 for managing file system volumes across a cluster in accordance with one or more embodiments. It is understood that the process 1400 may be modified by, for example, but not limited to, the addition of one or more other operations. Process 1400 may be implemented using, for example, without limitation, distributed storage management system 100 in FIG. 1.

Process 1400 may begin by hosting a file system volume on a node of a plurality of nodes in a cluster, where the file system volume may be exposed to an application layer by a data management subsystem (operation 1402).

File system data and file system metadata of the file system volume are mapped to a data block comprising a set of logical block addresses of a logical block device in a storage management subsystem that is disaggregated from the data management subsystem (operation 1404). In one or more embodiments, operation 1404 may be performed by mapping the file system data and file system metadata to a logical aggregate and then mapping the logical aggregate to the logical block device.

A logical block address of each logical block address in the set of logical block addresses is mapped to a block identifier that is stored in a metadata object within a node metadata block store (operation 1406). The block identifier is a computed hash value for the data block of the logical block device (e.g., the file system data and file system metadata of the file system volume).

The block identifier and the data block of the logical block device are stored in a key-value store, accessible by a block service (operation 1408). Each node in the cluster has its own instance of the key-value store deployed on that node, but the "namespace" of the key-value store is distributed across the nodes of the cluster. The block identifier identifies where in the cluster (e.g., on which node(s)) the data block is stored. The block identifier is stored as the "key" and the data block is stored as the "value."

FIG. 15 is a flow diagram illustrating examples of operations in a process 1500 for improving resiliency across a distributed file system in accordance with one or more embodiments. In particular, process 1500 may be implemented to protect against node failures to improve resiliency. It is understood that the process 1500 may be modified by, for example, but not limited to, the addition of one or more other operations. Process 1500 may be implemented using, for example, without limitation, distributed storage management system 100 in FIG. 1.

Process 1500 may include distributing a plurality of data blocks that correspond to a file system volume, which is associated with a file system instance deployed on a selected node, within a distributed block layer of a distributed file system across a plurality of nodes in a cluster (operation 1502). Each data block may have a location in the cluster identified by a block identifier associated with each data block.

Each data block of the plurality of data blocks is replicated on at least one other node in the plurality of nodes (operation 1504). In operation 1504, this replication may be based on, for example, a replication factor (e.g., replication factors=2, 3, etc.) that indicates how many replications are to be performed. In one or more embodiments, the replication factor may be configurable.

A metadata object corresponding to a logical block device that maps to the file system volume is replicated on at least one other node in the plurality of nodes, where the metadata object is hosted on virtualized storage that is protected using redundant array independent disks (RAID) (operation 1506). In one or more embodiments, the replication in operation 1506 may be performed according to a replication factor that is the same as or different from the replication factor described above with respect to operation 1504.

The replication performed in process 1500 may help protect against node failures with the cluster. The use of a RAID-protected virtualized storage may help protect against drive failures at the node level within the cluster. In this manner, the distributed file system has multi-tier protection that leads to overall file system resiliency and availability.

FIG. 16 is a flow diagram illustrating examples of operations in a process 1600 for reducing write latency in a distributed file system in accordance with one or more embodiments. It is understood that the process 1600 may be modified by, for example, but not limited to, the addition of one or more other operations. Process 1600 may be implemented using, for example, without limitation, distributed storage management system 100 in FIG. 1. Further, process 1600 may be implemented using, for example, without limitation, distributed file system 102 in FIGS. 1 and/or 2.

Process 1600 may begin by receiving a write request that includes a volume identifier at a data management subsystem deployed on a node within a distributed file system (operation 1602). The write request may include, for example, write data and write metadata that is to be written to a file system volume that may be identified using volume identifier. The data management subsystem maps the volume identifier to a file system volume (operation 1604).

The data management subsystem maps the file system volume to a logical block device hosted by a storage management subsystem deployed on the node (operation 1606). In operation 1604, the write data and metadata may form a data block of the logical block device. The data block may be comprised of one or more LBAs (e.g., locations) to which the write data and the write metadata are to be written. Thus, operation 1606 may include mapping the file system volume to a set of LBAs in the logical block device. The file system volume and the logical block device are co-located on the same node to reduce the write latency associated with servicing the write request. In one or more embodiments, operation 1606 is performed by mapping the file system volume to a logical aggregate and then mapping the logical aggregate to the set of LBAs in the logical block device.

The storage management subsystem maps the logical block device to a metadata object for the logical block device on the node that is used to process the write request (operation 1608). The mapping of the file system volume to the logical block device creates a one-to-one relation of the filesystem volume to the logical block device. The metadata object of the logical block device always being local to the logical block device enables co-locating the metadata object with the file system volume on the node. Co-locating the metadata object with the file system volume on the same node reduces an extra network hop needed for the write request, thereby reducing the write latency associated with processing the write request.

With respect to writes, the distributed file system provides 1:1:1 mapping of the file system volume to the logical aggregate to the logical block device. This mapping enables the metadata object of the logical block device to reside on the same node as the file system volume and thus enables colocation. Accordingly, this mapping enables local metadata updates during a write as compared to having to communicate remotely with another node in the cluster. Thus, the metadata object, the file system volume, the logical aggregate, and the logical block device may be co-located on the same node to reduce the write latency associated with servicing the write request. Co-locating the metadata object with the file system volume may mean that one less network hop (e.g., from one node to another node) may be needed to access the metadata object. Reducing a total number of network hops may reduce the write latency.

In one or more embodiments, mapping the logical block device to the metadata object may include updating the metadata object (which may include creating the metadata object) with a mapping of the data block (e.g., the set of LBAs) to one or more block identifiers. For example, a block identifier may be computed for each LBA, the block identifier being a hash value for the write data and metadata content of the write request.

FIG. 17 is a flow diagram illustrating examples of operations in a process 1700 for reducing read latency in a distributed file system in accordance with one or more embodiments. It is understood that the process 1700 may be modified by, for example, but not limited to, the addition of one or more other operations. Process 1700 may be implemented using, for example, without limitation, distributed storage management system 100 in FIG. 1. Further, process 1700 may be implemented using, for example, without limitation, distributed file system 102 in FIGS. 1 and/or 2.

Process 1700 may include storing a set of indirect blocks for a block identifier in a buffer tree during processing of a write request, the block identifier corresponding to a data block of a logical block device (operation 1702). The logical block device belongs to a distributed block layer of the distributed file system. Data is written to the data block during processing of the write request.

An initial read request is received for the data in the data block (operation 1704). The initial read request is processed, causing the set of indirect blocks in the buffer tree to be paged into memory from disk such that the corresponding block identifier is stored in a buffer cache in the data management subsystem (operation 1706).

Process 1700 further includes receiving, at a data management subsystem deployed on a node within a distributed storage system, a read request from a source, the read request including a volume identifier (operation 1708). This read request may be received some time after the initial read request. The source may be a client (e.g., a client node) or application. The volume identifier is mapped to a file system volume managed by the data management subsystem (operation 1710).

A data block within the file system volume is associated, by the data management subsystem, with a block identifier that corresponds to a data block of a logical block device in a distributed block layer of the distributed file system (operation 1712). The file system volume comprises of one or more of a file system volume data blocks and file system volume metadata blocks associated with the read request. For example, the content of the file system volume comprises the data and/or metadata of the read request and is stored in one or more data blocks in the logical block device. The block identifier is a computed hash value for the data block or metadata block for the filesystem volume and, as described above, is stored within a buffer cache in the data management subsystem.

Operation 1712 may be performed by looking up the block identifier corresponding to the read request using the set of indirect blocks and the buffer cache in the data management subsystem, thereby bypassing consultation of a metadata object corresponding to the logical block device.

The data in the data block is accessed using the block identifier identified in operation 1712 (operation 1714). The data stored in the data block is sent to the source (operation 1716). In this manner, the read request is satisfied. The operations described above with respect to processing the read request may illustrate a "fast read path" in which read latency is reduced. Read latency may be reduced because the file system volume data can be directly mapped to a block identifier that is stored within the filesystem volume's buffer tree in the data management subsystem. This block identifier is used to address the data directly from the data management subsystem without having to consult multiple intermediate layers, for example the metadata service for the logical block device.

Various components of the present embodiments described herein may include hardware, software, or a combination thereof. Accordingly, it may be understood that in other embodiments, any operation of the distributed storage management system 100 in FIG. 1 or one or more of its components thereof may be implemented using a computing system via corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the embodiments described herein provide a software-defined services-based architecture in which services can be started and stopped on demand (e.g., starting and stopping services on demand within each of the data management subsystem and the storage management subsystem). Each service manages one or more aspects of the distributed storage management system as needed. The distributed storage management subsystem is architected to run on both shared nothing storage and shared storage architectures. The distributed storage management subsystem can leverage locally attached storage as well as network attached storage.

The disaggregation or decoupling of the data management and storage management subsystems enables deployment of the data management subsystem closer to the application (including, in some cases, on the application node) either as an executable or a statically or dynamically linked library (stateless). The decoupling of the data management and storage management subsystems allows scaling the data management layer along with the application (e.g., per the application needs such as, for example, multi-tenancy and/or QoS needs). In some embodiments, the data management subsystem may reside along with the storage management subsystem on the same node, while still being capable of operating separately or independently of the storage management subsystem. While the data management subsystem caters to application data lifecycle management, backup, disaster recovery, security and compliance, the storage management subsystem caters to storage-centric features such as, for example, but not limited to, block storage, resiliency, block sharing, compression/deduplication, cluster expansion, failure management. and auto healing.

Further, the decoupling of the data management subsystem and the storage management subsystem enables multiple personas for the distributed file system on a cluster. The distributed file system may have both a data management subsystem and a storage management subsystem deployed, may have only the data management subsystem deployed, or may have only the storage management subsystem deployed. Still further, the distributed storage management subsystem is a complete solution that can integrate with multiple protocols (e.g., NFS, SMB, iSCSI, S3, etc.), data mover solutions (e.g., snapmirror, copy-to-cloud), and tiering solutions (e.g., fabric pool).

The distributed file system enables scaling and load balancing via mapping of a file system volume managed by the data management subsystem to an underlying distributed block layer (e.g., comprised of multiple node block stores) managed by the storage management subsystem. A file system volume on one node may have its data blocks and metadata blocks distributed across multiple nodes within the distributed block layer. The distributed block layer, which can automatically and independently grow, provides automatic load balancing capabilities by, for example, relocating (without a data copy) of file system volumes and their corresponding objects in response to events that prompt load balancing. Further, the distributed file system can map multiple file system volumes to the underlying distributed block layer with the ability to service multiple I/O operations for the file system volumes in parallel.

The distributed file system described by the embodiments herein provides enhanced resiliency by leveraging a combination of block replication (e.g., for node failure) and RAID (e.g., for drive failures within a node). Still further, recovery of local drive failures may be optimized by rebuilding from RAID locally. Further, the distributed file system provides auto-healing capabilities. Still further, the file system data blocks and metadata blocks are mapped to a distributed key-value store that enables fast lookup of data In this manner, the distributed file system of the distributed storage management system described herein provides various capabilities that improve the performance and utility of the distributed storage management system as compared to traditional data storage solutions. This distributed file system is further capable of servicing I/Os efficiently even with its multi-layered architecture. Improved performance is provided by reducing network transactions (or hops), reducing context switches in the I/O path, or both.

With respect to writes, the distributed file system provides 1:1:1 mapping of a file system volume to a logical aggregate to a logical block device. This mapping enables colocation of the logical block device on the same node as the filesystem volume. Since the metadata object corresponding to the logical block device co-resides on the same node as the logical block device, the colocation of the filesystem volume and the logical block device enables colocation of the filesystem volume and the metadata object pertaining to the logical block device. Accordingly, this mapping enables local metadata updates during a write as compared to having to communicate remotely with another node in the cluster.

With respect to reads, the physical volume block number (pvbn) in the file system indirect blocks and buftree at the data management subsystem may be replaced with a block identifier. This type of replacement is enabled because of the 1:1 mapping between the file system volume and the logical aggregate (as described above) and further, the 1:1 mapping between the logical aggregate and the logical block device. This enables a data block of the logical aggregate to be a data block of the logical block device. Because a data block of the logical block device is identified by a block identifier, the block identifier (or the higher order bits of the block identifier) may be stored instead of the pvbn in the filesystem indirect blocks and buftree at the data management subsystem. Storing the block identifier in this manner enables a direct lookup of the block identifier from the file system layer of the data management subsystem instead of having to consult the metadata objects of the logical block device in the storage management subsystem. Thus, a crucial context switch is reduced in the IO path.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for reducing write latency in a distributed file system, the method comprising:

for a given node of a plurality of nodes of a distributed storage system:

reducing write latency associated with processing of write requests by co-locating, by the distributed storage system, a metadata object with a file system volume on the given node, wherein a first mapping, maintained by a data management subsystem of the given node, of the file system volume to a set of logical block addresses in a logical block device of a storage management subsystem of the given node enables the co-locating; and maintaining, by the storage management subsystem of the given node, a second mapping of the logical block device to the metadata object on the given node;

receiving a write request at the data management subsystem;

identifying, by the data management subsystem, the file system volume on the given node to which the write request is directed based on a volume identifier associated with the write request; and servicing the write request by utilizing, by the data management subsystem and the storage management subsystem the first mapping and the second mapping.

2. The method of claim 1, wherein co-location of the file system volume, the logical block device, and the metadata object on the given node reduces the write latency associated with the write request by enabling local metadata updates.

3. The method of claim 2, further comprising sending, by the data management subsystem, a request that identifies a set of logical block addresses to which data from the write request is to be written in the logical block device over a local pathway to the storage management subsystem.

4. The method of claim 1, further comprising computing, by a metadata service in the storage management subsystem, a set of block identifiers based on a request received from the data management subsystem, the request identifying the set of logical block addresses to which data from the write request is to be written in the logical block device.

5. The method of claim 1, further comprising sending a response to a source of the write request after metadata and data associated with the write request are stored in a logging storage device associated with the given node.

6. A node of a distributed storage system comprising:
a memory; and
one or more processors coupled to the memory programmed with executable instructions, the instructions including:
a storage management subsystem for maintaining a first mapping of a logical block device to a metadata object and contributing to processing of write requests received by the node based on the first mapping; and
a data management subsystem for maintaining a second mapping of a file system volume to a set of logical block addresses in the logical block device and for contributing to processing of the write requests based on the second mapping, wherein the second mapping enables co-locating of the metadata object with the file system volume on the node, and wherein co-location of the metadata object with the file system volume on the node reduces write latency associated with the processing of the write requests.

7. The node of claim 6, wherein the file system volume is mapped to the set of logical block addresses in the logical block device by mapping the file system volume to a logical aggregate and mapping the logical aggregate to the set of logical block addresses in the logical block device.

8. The node of claim 6, wherein the file system volume, the logical block device, and the metadata object being co-located on the node reduces the write latency associated with the write request by enabling local metadata updates.

9. The node of claim 6, wherein the data management subsystem is configured to send a request that identifies a set of logical block addresses to which data associated with a given write request is to be written in the logical block device over a local pathway to the storage management subsystem.

10. The node of claim 6, wherein the storage management subsystem includes a metadata service configured to compute a set of block identifiers based on a request received from the data management subsystem, the request identifying the set of logical block addresses to which data associated with a given write request is to be written in the logical block device received from the data management subsystem.

11. The node of claim 6, wherein the storage management subsystem includes a metadata service configured to store a cryptographic hash for data that is to be written to a selected logical block address in the logical block device based on a given write request in a key-value store.

12. The node of claim 6, wherein the storage management subsystem includes a metadata service configured to overwrite a previously computed cryptographic hash associated with a selected block address in the logical block device with a new cryptographic hash.

13. A non-transitory machine readable medium storing instructions, which when executed by one or more central processing unit resources of a distributed storage system, cause the distributed storage system to:
for a given node of a plurality of nodes of the distributed storage system:
reduce write latency associated with processing of write requests by co-locating a metadata object with a file system volume on the given node, wherein a first mapping, maintained by a data management subsystem of the given node, of the file system volume to a set of logical block addresses in a logical block device of a storage management subsystem of the given node enables the co-locating; and
maintain within the storage management subsystem of the given node a second mapping of the logical block device to the metadata object on the given node;
receive a write request at the data management subsystem;
identify by the data management subsystem, the file system volume on the given node to which the write request is directed based on a volume identifier associated with the write request; and
service the write request by utilizing, by the data management subsystem and the storage management subsystem the first mapping and the second mapping.

14. The non-transitory machine readable medium of claim 13, wherein co-location of the file system volume, the logical block device, and the metadata object on the given node reduces the write latency associated with the write request by enabling local metadata updates.

15. The non-transitory machine readable medium of claim 13, wherein the instructions further cause the distributed storage system to send, by the data management subsystem, a request that identifies a set of logical block addresses to which data from the write request is to be written in the logical block device over a local pathway to the storage management subsystem.

16. The non-transitory machine readable medium of claim 13, wherein the instructions further cause the distributed storage system to compute, by a metadata service in the storage management subsystem, a set of block identifiers based on a request received from the data management subsystem, the request identifying the set of logical block addresses to which data from the write request is to be written in the logical block device.

17. The non-transitory machine readable medium of claim 13, wherein the instructions further cause the distributed storage system to:
compute a cryptographic hash for a data block formed by file system data and file system metadata that is to be written in the logical block device based on the write request; and
store the cryptographic hash as a key within a key-value store and the data block as a value within the key-value store.

18. The non-transitory machine readable medium of claim 13, wherein servicing of the write request includes overwriting a logical block address in the logical block device and overwriting a previously computed cryptographic hash associated with a selected block address in the logical block device with a new cryptographic hash.

19. The non-transitory machine readable medium of claim 13, wherein the instructions further cause the distributed storage system to send a response to a source of the write request after metadata and data associated with the write request are stored in a logging storage device associated with the given node.

20. The non-transitory machine readable medium of claim 13, wherein the instructions further cause the distributed storage system to:

compute a block identifier for a data block corresponding to write data and write metadata associated with the write request; and store the block identifier in a set of indirect nodes in a buffer tree within the data management subsystem.

\* \* \* \* \*